(12) United States Patent
Peng et al.

(10) Patent No.: US 12,341,545 B2
(45) Date of Patent: Jun. 24, 2025

(54) METHOD AND DEVICE FOR COMMUNICATION, AND STORAGE MEDIUM

(71) Applicant: SPREADTRUM COMMUNICATIONS (SHANGHAI) CO., LTD., Shanghai (CN)

(72) Inventors: Yexin Peng, Shanghai (CN); Yantao Li, Shanghai (CN)

(73) Assignee: SPREADTRUM COMMUNICATIONS (SHANGHAI) CO., LTD., Shanghai (CN)

(*) Notice: Subject to any disclaimer, the term of this patent is extended or adjusted under 35 U.S.C. 154(b) by 184 days.

(21) Appl. No.: 18/257,882

(22) PCT Filed: Nov. 17, 2021

(86) PCT No.: PCT/CN2021/131098
§ 371 (c)(1),
(2) Date: Jun. 16, 2023

(87) PCT Pub. No.: WO2022/127484
PCT Pub. Date: Jun. 23, 2022

(65) Prior Publication Data
US 2024/0056110 A1 Feb. 15, 2024

(30) Foreign Application Priority Data

Dec. 18, 2020 (CN) .......................... 202011506941.4

(51) Int. Cl.
*H04B 1/04* (2006.01)
*H04B 1/401* (2015.01)
*H04B 7/0404* (2017.01)

(52) U.S. Cl.
CPC ........... *H04B 1/0475* (2013.01); *H04B 1/401* (2013.01); *H04B 7/0404* (2013.01)

(58) Field of Classification Search
CPC ........ H04B 1/04; H04B 1/401; H04B 1/0475; H04B 1/707; H04B 1/713; H04B 7/0404;
(Continued)

(56) References Cited

U.S. PATENT DOCUMENTS

2005/0191964 A1 9/2005 Hundal
2008/0008124 A1* 1/2008 Hundal ................. H04W 16/16
370/328
(Continued)

FOREIGN PATENT DOCUMENTS

CN 1841949 A 10/2006
CN 102714538 A 10/2012
(Continued)

OTHER PUBLICATIONS

International Search Report (PCT/CN2021/131098); Date of Mailing: Jan. 29, 2022.
(Continued)

*Primary Examiner* — Shawkat M Ali
(74) *Attorney, Agent, or Firm* — Wiersch Law Group

(57) ABSTRACT

Provided are a method and device for communication and an electronic device. The method includes: determining whether impact of mutual interference between a first antenna and a second antenna on wireless signal transceiving of the first antenna and the second antenna exceeds a preset interference upper limit; and in response to a determination that the impact of the mutual interference between the first antenna and the second antenna on the wireless signal transceiving of the first antenna and the second antenna exceeds the preset interference upper limit, transceiving the first-mode wireless signal through the first antenna and transceiving the second-mode wireless signal through the second antenna. Transceiving of the first-mode wireless signal through the first antenna and transceiving of the second-mode wireless signal through the second antenna are performed in a time-division multiplexing (TDM) mode.

18 Claims, 8 Drawing Sheets

(58) Field of Classification Search
CPC ............ H04B 15/00; H04L 5/14; H04Q 7/00;
H04W 16/14; H04W 24/00; H04W 24/02;
H04W 36/20; H04W 72/12; H04W 88/06
USPC ........ 370/252, 253, 328, 329, 332; 375/133,
375/219, 295–297, 316; 455/63.1, 501
See application file for complete search history.

(56) References Cited

U.S. PATENT DOCUMENTS

2009/0262785 A1\* 10/2009 Wilhelmsson ........ H04W 16/14
455/63.1
2014/0221028 A1 8/2014 Desai et al.

FOREIGN PATENT DOCUMENTS

| CN | 110620290 A | 12/2019 |
|---|---|---|
| CN | 112020079 A | 12/2020 |
| CN | 112737629 A | 4/2021 |
| TW | 201006266 A | 2/2010 |

OTHER PUBLICATIONS

First Office Action(CN202011506941.4); Date of Mailing: Nov. 11, 2021.

\* cited by examiner

METHOD AND DEVICE FOR COMMUNICATION, AND STORAGE MEDIUM

CROSS-REFERENCE TO RELATED APPLICATIONS

This is the U.S. national stage of application No. PCT/CN2021/131098, filed on Nov. 17, 2021. Priority under 35 U.S.C. § 119 (a) and 35 U.S.C. § 365 (b) is claimed from Chinese Application No. 202011506941.4, filed Dec. 18, 2020, the disclosure of which is also incorporated herein by reference.

TECHNICAL FIELD

The present disclosure relates to the field of communication technologies, and in particular, to a method and device for communication, and an electronic device.

BACKGROUND

An existing communication device (such as a mobile phone, a tablet computer, or a television) is general provided with multiple types of wireless communication systems including Wireless Fidelity (Wi-Fi), Bluetooth (BT), 4G, and 5G. Most of communication devices that require high throughput performance employ a multi-antenna solution. When hardware design space is sufficient, interference between different wireless communication systems is usually avoided by ensuring sufficient hardware isolation between antennas, to achieve maximum throughput performance. However, for a device with limited hardware design space, such as a mobile phone, box, or set-top box, insufficient isolation between antennas results in serious interference between different wireless communication systems. Therefore, a new communication method is needed to resolve interference between different wireless communication modes in a multi-antenna application scenario.

SUMMARY

To resolve interference between different wireless communication modes in a multi-antenna application scenario in the existing art, the present disclosure provides a method and device for communication, an electronic device, and a computer-readable storage medium.

Embodiments of the present disclosure adopts the following technical solutions.

In a first aspect, the present disclosure provides a method for communication including the following steps.

Whether impact of mutual interference between a first antenna and a second antenna on wireless signal transceiving of the first antenna and the second antenna exceeds a preset interference upper limit is determined, where the first antenna is configured to transceive a first-mode wireless signal, and the second antenna is configured to transceive a second-mode wireless signal.

In response to a determination that the impact of the mutual interference between the first antenna and the second antenna on the wireless signal transceiving of the first antenna and the second antenna exceeds the preset interference upper limit, the first-mode wireless signal is transceived through the first antenna, and the second-mode wireless signal is transceived through the second antenna.

Transceiving of the first-mode wireless signal through the first antenna and the transceiving of the second-mode wireless signal through the second antenna are performed in a time-division multiplexing (TDM) mode.

In some embodiments, the method further includes: in response to a determination that the impact of the mutual interference between the first antenna and the second antenna on the wireless signal transceiving of the first antenna and the second antenna does not exceed the preset interference upper limit, transceiving the first-mode wireless signal through the first antenna and transceiving the second-mode wireless signal through the second antenna.

The transceiving of the first-mode wireless signal through the first antenna and the transceiving of the second-mode wireless signal through the second antenna are performed in a frequency-division multiplexing (FDM) mode.

In some embodiments, the second antenna is further configured to transceive the first-mode wireless signal.

In response to a determination that the impact of the mutual interference between the first antenna and the second antenna on the wireless signal transceiving of the first antenna and the second antenna does not exceed the preset interference upper limit, the first-mode wireless signal is transceived through the first antenna, and the first-mode wireless signal and the second-mode wireless signal are transceived through the second antenna.

The transceiving of the first-mode wireless signal through the first antenna and the transceiving of the second-mode wireless signal through the second antenna are performed in the FDM mode.

The transceiving of the first-mode wireless signal through the second antenna and the transceiving of the second-mode wireless signal through the second antenna are performed in the TDM mode.

In some embodiments, the second antenna is further configured to transceive the first-mode wireless signal.

In response to a determination that the impact of the mutual interference between the first antenna and the second antenna on the wireless signal transceiving of the first antenna and the second antenna exceeds the preset interference upper limit, the first-mode wireless signal is transceived through the first antenna, and the first-mode wireless signal and the second-mode wireless signal are transceived through the second antenna.

The transceiving of the first-mode wireless signal through the first antenna and the transceiving of the second-mode wireless signal through the second antenna are performed in the TDM mode.

The transceiving of the first-mode wireless signal through the second antenna and the transceiving of the second-mode wireless signal through the second antenna are performed in the TDM mode.

In some embodiments, whether the impact of the mutual interference between the first antenna and the second antenna on the wireless signal transceiving of the first antenna and the second antenna exceeds the preset interference upper limit is determined as follows.

In response to a determination that a transmit power of the first antenna to transmit the first-mode wireless signal affects performance of the second antenna in receiving the second-mode wireless signal or in response to a determination that a transmit power of the second antenna to transmit the second-mode wireless signal affects performance of the first antenna in receiving the first-mode wireless signal, it is determined that the impact of the mutual interference between the first antenna and the second antenna on the wireless signal transceiving of the first antenna and the second antenna exceeds the preset interference upper limit.

In some embodiments, whether the impact of the mutual interference between the first antenna and the second antenna on the wireless signal transceiving of the first antenna and the second antenna exceeds the preset interference upper limit is determined as follows.

In response to a determination that a transmit power of the first antenna to transmit the first-mode wireless signal does not meet a requirement for performance of a first device in receiving the first-mode wireless signal or in response to a determination that a transmit power of the second antenna to transmit the second-mode wireless signal does not meet a requirement for performance of a second device in receiving the second-mode wireless signal, it is determined that the impact of the mutual interference between the first antenna and the second antenna on the wireless signal transceiving of the first antenna and the second antenna exceeds the preset interference upper limit. The first device is a device that transceives the first-mode wireless signal with the first antenna, and the second device is a device that transceives the second-mode wireless signal with the second antenna.

In some embodiments, the determining whether the impact of the mutual interference between the first antenna and the second antenna on the wireless signal transceiving of the first antenna and the second antenna exceeds the preset interference upper limit includes: obtaining a first signal strength of the first-mode wireless signal received by the first antenna; obtaining a second signal strength of the second-mode wireless signal received by the second antenna; and in response to a determination that the first signal strength is less than a first strength threshold or in response to a determination that the second signal strength is less than a second strength threshold, determining that the impact of the mutual interference between the first antenna and the second antenna on the wireless signal transceiving of the first antenna and the second antenna exceeds the preset interference upper limit; in response to a determination that the first signal strength is less than a third strength threshold and the second signal strength is less than a fourth strength threshold, determining that the impact of the mutual interference between the first antenna and the second antenna on the wireless signal transceiving of the first antenna and the second antenna exceeds the preset interference upper limit, where the third strength threshold is greater than the first strength threshold, and the fourth strength threshold is greater than the second strength threshold; in response to a determination that the first signal strength is less than a fifth strength threshold and the second signal strength is less than a sixth strength threshold, determining that the impact of the mutual interference between the first antenna and the second antenna on the wireless signal transceiving of the first antenna and the second antenna exceeds the preset interference upper limit, where the fifth strength threshold is greater than the third strength threshold, and the sixth strength threshold is greater than the fourth strength threshold.

In a second aspect, the present disclosure provides a device for communication including an interference determining module and an antenna allocation module.

The interference determining module is configured to determine whether impact of mutual interference between a first antenna and a second antenna on wireless signal transceiving of the first antenna and the second antenna exceeds a preset interference upper limit, where the first antenna is configured to transceive a first-mode wireless signal, and the second antenna is configured to transceive a second-mode wireless signal.

The antenna allocation module configured to, in response to a determination that the impact of the mutual interference between the first antenna and the second antenna on the wireless signal transceiving of the first antenna and the second antenna exceeds the preset interference upper limit, transceive the first-mode wireless signal through the first antenna and transceive the second-mode wireless signal through the second antenna.

The transceiving of the first-mode wireless signal through the first antenna and the transceiving of the second-mode wireless signal through the second antenna are performed in a TDM mode.

In a third aspect, the present disclosure provides a wireless communication chip configured to transceive a first-mode wireless signal and a second-mode wireless signal. The wireless communication chip includes a processor configured to execute computer program instructions stored in a memory. When the computer program instructions are executed by the processor, the wireless communication chip is caused to perform the method according to the embodiments of the present disclosure to transceive the first-mode wireless signal and the second-mode wireless signal.

In a fourth aspect, the present disclosure provides an electronic device including a first antenna, a second antenna, and a wireless communication chip. The wireless communication chip includes a memory configured to store computer program instructions and a processor configured to execute the computer program instructions. When the computer program instructions are executed by the processor, the electronic device is caused to perform the method of any one of claims 1 to 7 through the first antenna and the second antenna.

In a fifth aspect, the present disclosure provides a computer-readable storage medium having stored thereon instructions that, when executed by a computer, cause the computer to perform the method according to embodiments of the present disclosure.

The above technical solutions proposed according to the embodiments of the present disclosure can achieve at least the following technical effects.

DESCRIPTION OF EMBODIMENTS

To make the objective, technical solutions, and advantages of the present disclosure clearer, the technical solutions in the present disclosure are clearly and completely described below with reference to specific embodiments and corresponding accompanying drawings of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The terms used in the embodiments of the present disclosure are used only to explain the specific embodiments of the present disclosure, and are not intended to limit the present disclosure.

In view of interference between different wireless communication modes in a multi-antenna application scenario in the existing art, a feasible method is to implement different wireless communication modes in a time-division multiplexing (TDM) mode and allocate different timeslots to different wireless communication modes. Because of working in different timeslots, there is no mutual interference between different wireless communication modes.

Figure 1:
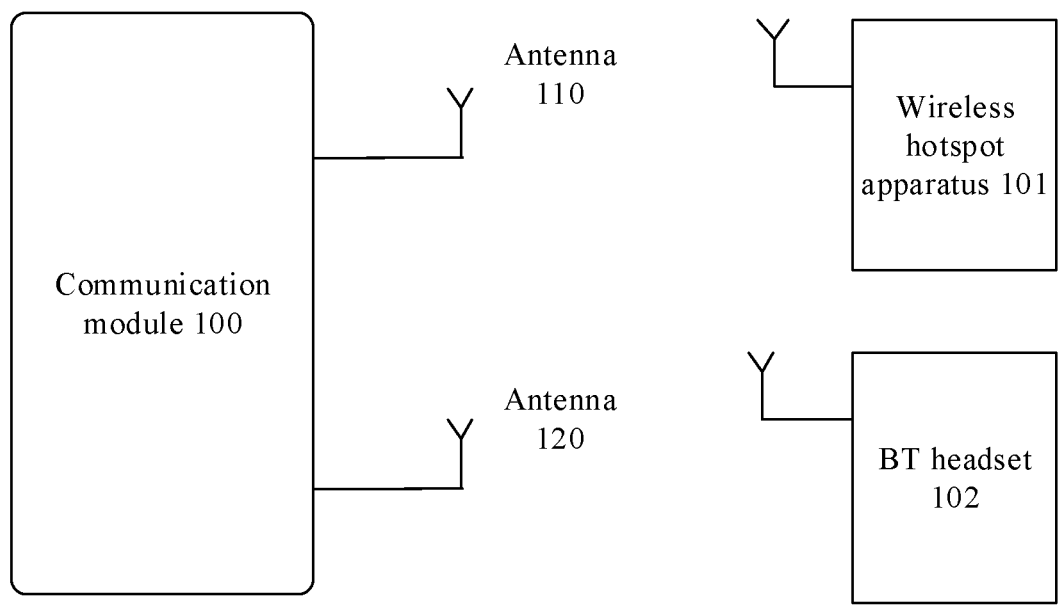
FIG. 1 is a schematic diagram of an application scenario according to an embodiment of the present disclosure.

FIG. 1 is a schematic diagram of an application scenario according to an embodiment of the present application. For example, as shown in FIG. 1, a communication module 100 is a communication hardware device in a mobile phone, and is connected to antennas 110 and 120 of the mobile phone (isolation between the antennas 110 and 120 depends on hardware design and a spatial layout of the device).

In an application scenario, the communication module 100 supports Wi-Fi wireless communication and Bluetooth (BT) wireless communication. The communication module 100 may implement Wi-Fi wireless communication (for example, communicate with a wireless hotspot apparatus 101) through the antenna 110 and implement BT wireless communication (for example, communicate with a BT headset 102) through the antenna 120. When the communication module 100 simultaneously implements Wi-Fi wireless communication and BT wireless communication through the antennas 110 and 120, insufficient isolation between the antennas 110 and 120 results in interference between the Wi-Fi wireless communication and the BT wireless communication.

To resolve mutual interference between the antennas 110 and 120, in a feasible method, the Wi-Fi wireless communication of the antenna 110 and the BT wireless communication of the antenna 120 are performed in the TDM mode. In other words, the Wi-Fi wireless communication and the BT wireless communication are not simultaneously performed. For example, in a communication cycle having 10 communication timeslots, the communication module 100 implements Wi-Fi wireless communication through the antenna 110 in the $1^{st}$, $3^{rd}$, $5^{th}$, $7^{th}$, and $9^{th}$ communication timeslots. The communication module 100 does not implement BT wireless communication through the antenna 120 in the foregoing communication timeslots. The communication module 100 implements BT wireless communication through the antenna 120 in $2^{th}$, $4^{th}$, $6^{th}$, $8^{th}$, and $10^{th}$ communication timeslots. The communication module 100 does not implement Wi-Fi wireless communication through the antenna 110 in the foregoing communication timeslots. Because the Wi-Fi wireless communication of the antenna 110 and the BT wireless communication of the antenna 120 are not simultaneously performed (only one antenna is working at one moment), there is no mutual interference between the Wi-Fi wireless communication of the antenna 110 and the BT wireless communication of the antenna 120.

Although the TDM mode can resolve the interference between the Wi-Fi wireless communication of the antenna 110 and the BT wireless communication of the antenna 120, throughput performance of the Wi-Fi wireless communication and the BT wireless communication is greatly reduced in TDM mode. In view of this problem, an embodiment of the present disclosure provides a communication solution. In a multi-antenna application scenario, it is first determined whether impact of mutual interference between antennas on wireless signal transceiving exceeds a preset interference upper limit. If the impact exceeds the preset interference upper limit, communication is performed in TDM mode to avoid signal interference between antennas. If the impact does not exceed the preset interference upper limit, communication is performed in a frequency-division multiplexing (FDM) mode to achieve maximum throughput performance.

A specific application scenario is used as an example. In the application scenario, a communication system includes at least an antenna A and an antenna B. The communication system may use at least a wireless communication mode A and a wireless communication mode B (for example, a Wi-Fi wireless communication mode and a BT wireless communication mode). The antenna A may be configured to transceive a wireless signal in the wireless communication mode A (for example, transceive a Wi-Fi wireless signal). The antenna B may be configured to transceive a wireless signal in the wireless communication mode B (for example, transceive a BT wireless signal).

Figure 2:
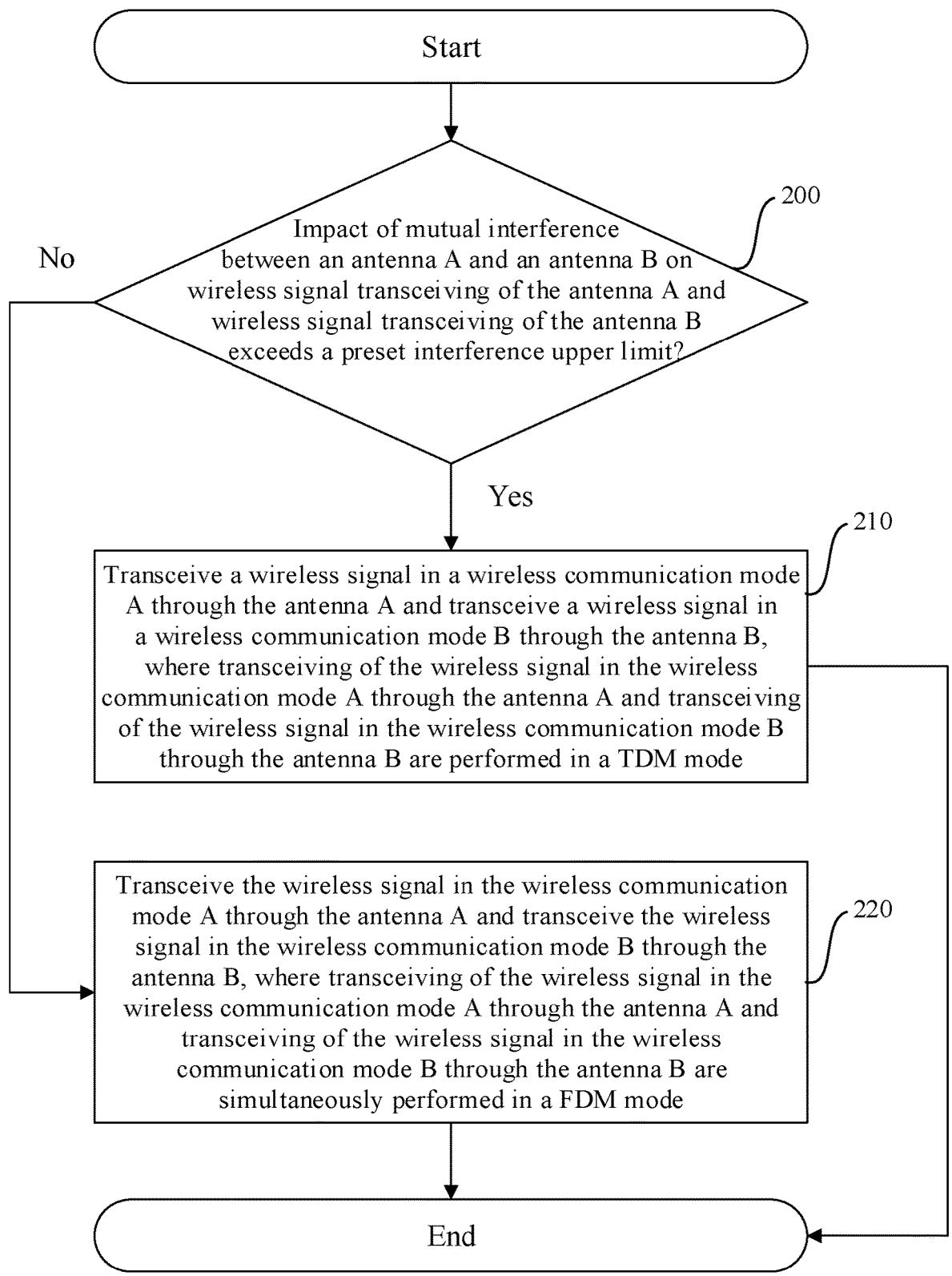
FIG. 2 is a flowchart of a method for communication according to an embodiment of the present disclosure.

FIG. 2 is a flowchart of a method for communication according to an embodiment of the present disclosure. The communication system uses the method shown in FIG. 2 to transceive the wireless signal in the wireless communication mode A through the antenna A and transceive the wireless signal in the wireless communication mode B through the antenna B.

At S200, it is determined whether impact of mutual interference between the antenna A and the antenna B on wireless signal transceiving of the antenna A and the antenna B exceeds a preset interference upper limit.

At S210, in response to a determination that the impact of the mutual interference between the antenna A and the antenna B on the wireless signal transceiving of the antenna A and the antenna B exceeds the preset interference upper limit, the wireless signal in the wireless communication mode A is transceived through the antenna A and the wireless signal in the wireless communication mode B is transceived through the antenna B.

The transceiving of the wireless signal in the wireless communication mode A through the antenna A and the transceiving of the wireless signal in the wireless communication mode B through the antenna B are performed in a TDM mode.

At S220, in response to a determination that the impact of the mutual interference between the antenna A and the antenna B on the wireless signal transceiving of the antenna A and the antenna B does not exceed the preset interference upper limit, the wireless signal in the wireless communication mode A is transceived through the antenna A and the wireless signal in the wireless communication mode B is transceived through the antenna B.

The transceiving of the wireless signal in the wireless communication mode A through the antenna A and the transceiving of the wireless signal in the wireless communication mode B through the antenna B are simultaneously performed in a FDM mode.

According to the method in the embodiments of the present disclosure, an antenna transceiving strategy is configured based on an actual situation of wireless signal transceiving in a multi-antenna and multi-wireless communication mode application scenario. Wireless signal throughput performance is greatly improved while stability of wireless signal transceiving is ensured.

The application scenario shown in FIG. 1 is used as an example. The mobile phone first determines whether impact of the mutual interference between the antenna 110 and the antenna 120 on Wi-Fi wireless signal transceiving of the antenna 110 and BT wireless signal transceiving of the antenna B exceeds the preset interference upper limit.

In response to a determination that the impact of the mutual interference between the antenna 110 and the antenna 120 on the Wi-Fi wireless signal transceiving of the antenna 110 and the BT wireless signal transceiving of the antenna 120 exceeds the preset interference upper limit, the communication module 100 transceives the Wi-Fi wireless signal through the antenna 110 and transceives the BT wireless signal through the antenna 120. Transceiving the Wi-Fi wireless signal through the antenna 110 and transceiving the BT wireless signal through the antenna 120 are performed in the TDM mode.

Figure 3:
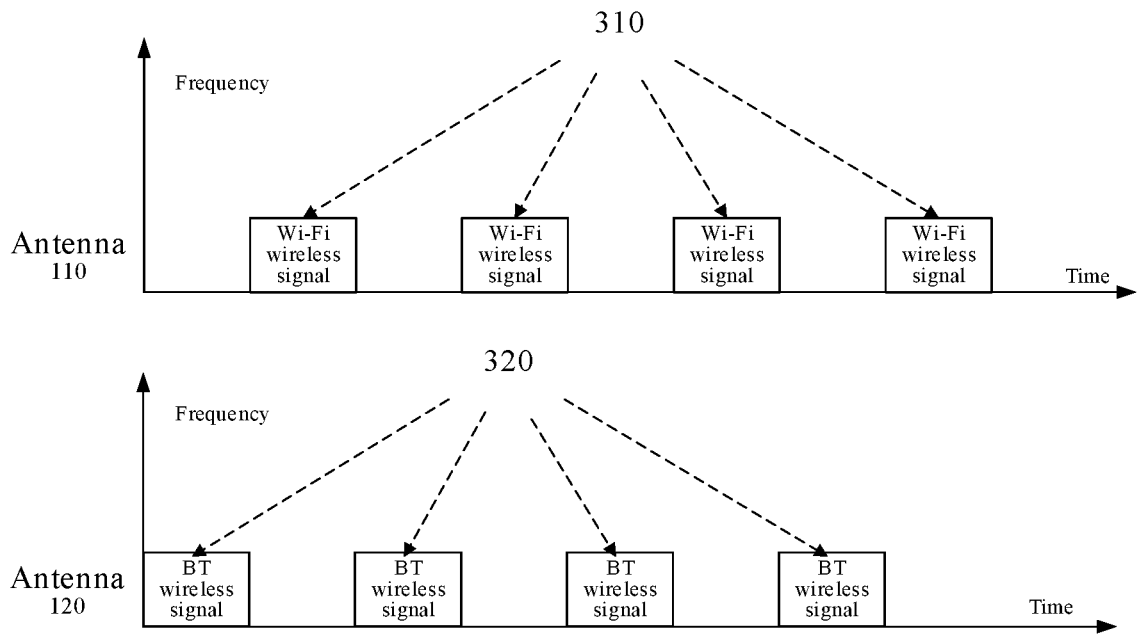
FIG. 3 is a schematic diagram of timeslots in which antennas transceive wireless signals according to an embodiment of the present disclosure.

FIG. 3 is a schematic diagram of timeslots in which antennas transceive wireless signals according to an embodiment of the present disclosure. As shown in FIG. 3, the antenna 110 transceives Wi-Fi wireless signals in timeslots 310 which, and the antenna 120 transceives BT wireless signals in timeslots 320. The timeslots in which the antenna 110 transceives the Wi-Fi wireless signals do not overlap the timeslots in which the antenna 120 transceives the BT wireless signals.

In response to a determination that the impact of the mutual interference between the antenna 110 and the antenna 120 on the Wi-Fi wireless signal transceiving of the antenna 110 and the BT wireless signal transceiving of the antenna 120 does not exceed the preset interference upper limit, the communication module 100 transceives the Wi-Fi wireless signal through the antenna 110 and transceives the BT wireless signal through the antenna 120. Transceiving the Wi-Fi wireless signal through the antenna 110 and transceiving the BT wireless signal through the antenna 120 are performed in FDM mode.

Figure 4:
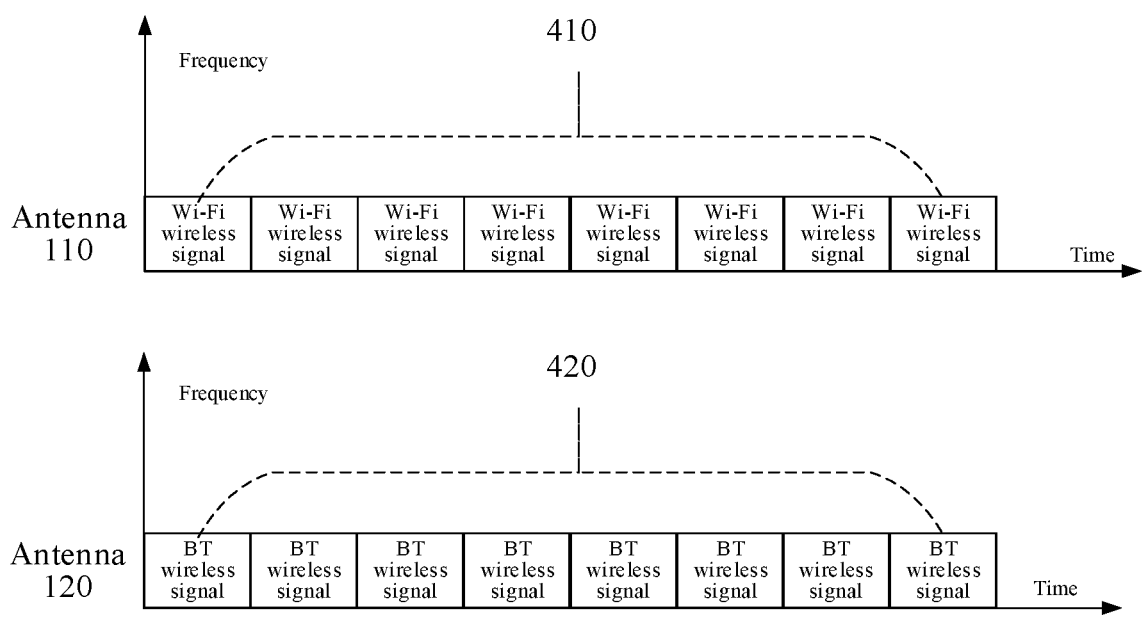
FIG. 4 is a schematic diagram of timeslots in which antennas transceive wireless signals according to an embodiment of the present v.

FIG. 4 is a schematic diagram of timeslots in which antennas transceive wireless signals according to an embodiment of the present disclosure. As shown in FIG. 4, the antenna 110 transceives Wi-Fi wireless signals in timeslots 410, and the antenna 120 transceives BT wireless signals in timeslots 420. The timeslots in which the antenna 110 transceives the Wi-Fi wireless signals overlap the timeslots in which the antenna 120 transceives the BT wireless signals.

Further, in an actual application scenario, there is a hardware design solution for implementing a plurality of wireless communication modes through a same antenna. In view of the foregoing situation, in an embodiment, both implementing multiple wireless communication modes through a same antenna coordinate and implementing multiple wireless communication modes through different antennas are employed. In a communication process, for any antenna, multiple wireless communication modes are implemented through the antenna in the TDM mode. Multiple wireless communication modes are implemented through different antennas in the FDM mode or the TDM mode based on mutual interference between different antennas.

For example, in the embodiment shown in FIG. 2, the antenna B may further be configured to transceive the wireless signal in the wireless communication mode A. The S210 may be implemented as follows.

The wireless signal in the wireless communication mode A is transceived through the antenna A, the wireless signal in the wireless communication mode B is transceived through the antenna B, and the wireless signal in the wireless communication mode A is transceived through the antenna B.

Transceiving the wireless signal in the wireless communication mode A through the antenna A and transceiving the wireless signal in the wireless communication mode B through the antenna B are performed in the TDM mode.

Transceiving the wireless signal in the wireless communication mode A through the antenna B and transceiving the wireless signal in the wireless communication mode B through the antenna B are performed in the TDM mode.

Specifically, in the example embodiment shown in FIG. 1, the communication module 100 may further implement the Wi-Fi wireless communication (for example, communicate with the wireless hotspot apparatus 101) through the antenna 120. In response to a determination that the impact of the mutual interference between the antenna 110 and the antenna 120 on the Wi-Fi wireless signal transceiving of the antenna 110 and the BT wireless signal transceiving of the antenna 120 exceeds the preset interference upper limit.

The communication module 100 transceives the Wi-Fi wireless signal through the antenna 110, transceives the BT wireless signal through the antenna 120, and transceives the Wi-Fi wireless signal through the antenna 120.

Transceiving the Wi-Fi wireless signal through the antenna 120 and transceiving the BT wireless signal through the antenna 120 are performed in the TDM mode.

Transceiving the Wi-Fi wireless signal through the antenna 110 and transceiving the BT wireless signal through the antenna 120 are performed in the TDM mode.

Figure 5:
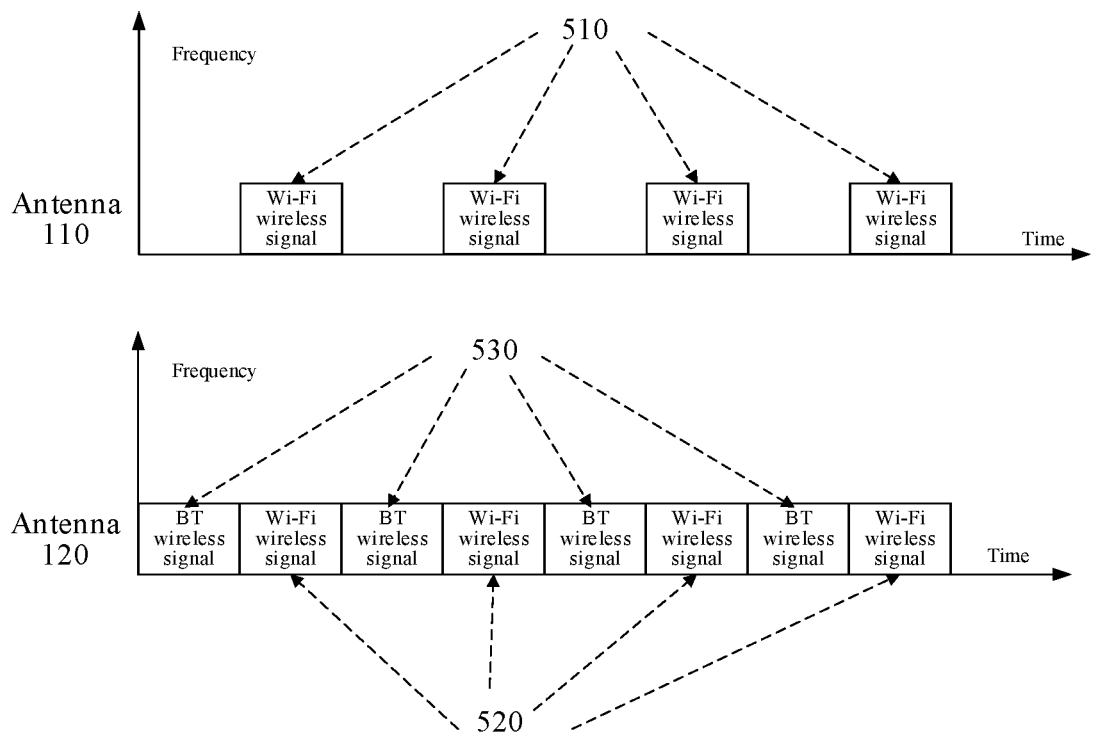
FIG. 5 is a schematic diagram of timeslots in which antennas transceive wireless signals according to an embodiment of the present disclosure.

FIG. 5 is a schematic diagram of timeslots in which antennas transceive wireless signals according to an embodiment of the present disclosure. As shown in FIG. 5, the antenna 110 transceives Wi-Fi wireless signals in timeslots 510, the antenna 120 transceives Wi-Fi wireless signals in timeslots 520, and the antenna 120 transceives BT wireless signals in timeslots 530. The timeslots in which the antenna 110 transceives the Wi-Fi wireless signals do not overlap the timeslots in which the antenna 120 transceives the BT wireless signals. The timeslots in which the antenna 120 transceives the Wi-Fi wireless signals do not overlap the timeslots in which the antenna 120 transceives the BT wireless signals.

For example, in the embodiment shown in FIG. 2, the antenna B may further be configured to transceive the wireless signal in the wireless communication mode A. S220 may be implemented as follows.

In response to a determination that the impact of the mutual interference between the antenna A and the antenna B on the wireless signal transceiving of the antenna A and the antenna B does not exceed the preset interference upper limit, the wireless signal in the wireless communication mode A is transceived through the antenna A, and the wireless signal in the wireless communication mode A and the wireless signal in the wireless communication mode B are transceived through the antenna B.

Transceiving the wireless signal in the wireless communication mode A through the antenna A and transceiving the wireless signal in the wireless communication mode B through the antenna B are simultaneously performed in the FDM mode.

Transceiving the wireless signal in the wireless communication mode A through the antenna B and transceiving the wireless signal in the wireless communication mode B through the antenna B are performed in the TDM mode.

Specifically, in the example embodiment shown in FIG. 1, the communication module 100 may further implement the Wi-Fi wireless communication (for example, communicate with the wireless hotspot apparatus 101) through the antenna 120. In response to a determination that the impact of the mutual interference between the antenna 110 and the antenna 120 on the Wi-Fi wireless signal transceiving of the antenna 110 and the BT wireless signal transceiving of the antenna B does not exceed the preset interference upper limit, the communication module 100 transceives the Wi-Fi wireless signal through the antenna 110, transceives the BT wireless signal through the antenna 120, and transceives the Wi-Fi wireless signal through the antenna 120.

Transceiving the Wi-Fi wireless signal through the antenna 120 and transceiving the BT wireless signal through the antenna 120 are performed in the TDM mode.

Transceiving the Wi-Fi wireless signal through the antenna 110 and transceiving the BT wireless signal through the antenna 120 are performed in the FDM mode.

Figure 6:
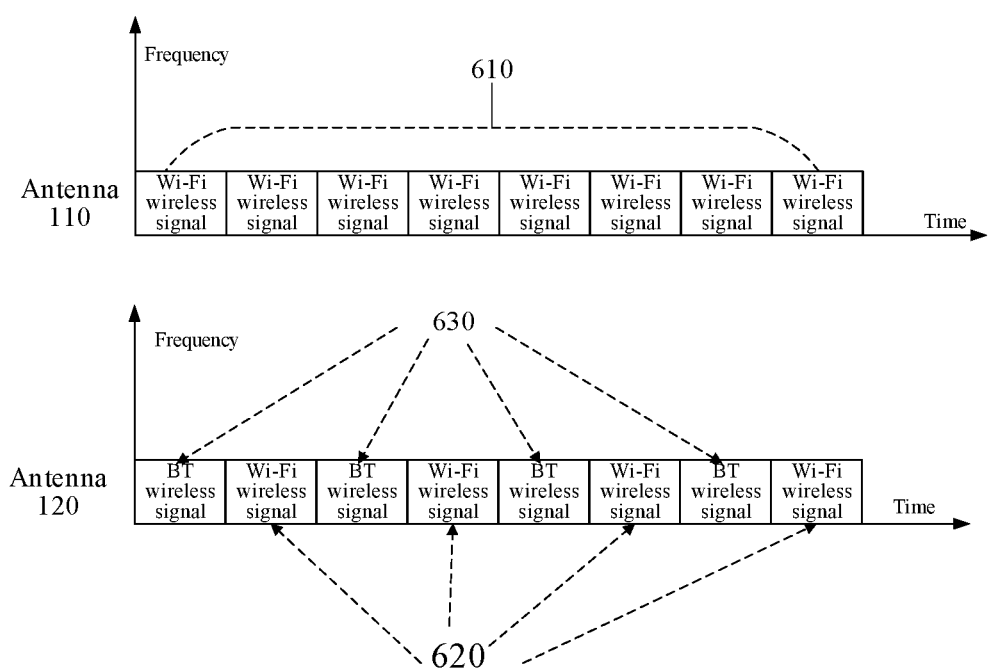
FIG. 6 is a schematic diagram of timeslots in which antennas transceive wireless signals according to an embodiment of the present disclosure.

FIG. 6 is a schematic diagram of timeslots in which antennas transceive wireless signals according to an embodiment of the present disclosure. As shown in FIG. 6, the antenna 110 transceives Wi-Fi wireless signals in timeslots 610, the antenna 120 transceives Wi-Fi wireless signals in timeslots 620, and the antenna 120 transceives BT wireless signals in in timeslots 630. The timeslots in which the antenna 110 transceives the Wi-Fi wireless signals overlap the timeslots in which the antenna 120 transceives the BT wireless signals. The timeslots in which the antenna 120 transceives the Wi-Fi wireless signals do not overlap the timeslots in which the antenna 120 transceives the BT wireless signals.

Further, in an actual application scenario, 2 or more antennas may be included in a same communication system. In the application scenario of 2 or more antennas, according to an embodiment of the present disclosure, the antennas are compared in pairwise. A working mode of each pair of antennas is determined based on a comparison result. Based on all determined working modes, working modes of the antennas in the communication system are determined.

For example, in an application scenario, a communication system includes at least an antenna A1, an antenna B1, and an antenna C1. The antenna A1 may be configured to transceive wireless signals in a wireless communication mode A1 (for example, transceive Wi-Fi wireless signals). The antenna B1 may be configured to transceive wireless signals in a wireless communication mode B1 (for example, transceive BT wireless signals). The antenna C1 may be configured to transceive wireless signals in a wireless communication mode C1 (for example, transceive 4G mobile network signals).

Whether impact of mutual interference between the antenna A1 and the antenna B1 on wireless signal transceiving of the antenna A1 and the antenna B1 exceeds the preset interference upper limit is determined.

Whether impact of mutual interference between the antenna A1 and the antenna C1 on wireless signal transceiving of the antenna A1 and the antenna C1 exceeds the preset interference upper limit is determined.

Whether impact of mutual interference between the antenna B1 and the antenna C1 on wireless signal transceiving of the antenna B1 and the antenna C1 exceeds the preset interference upper limit is determined.

Figure 7:
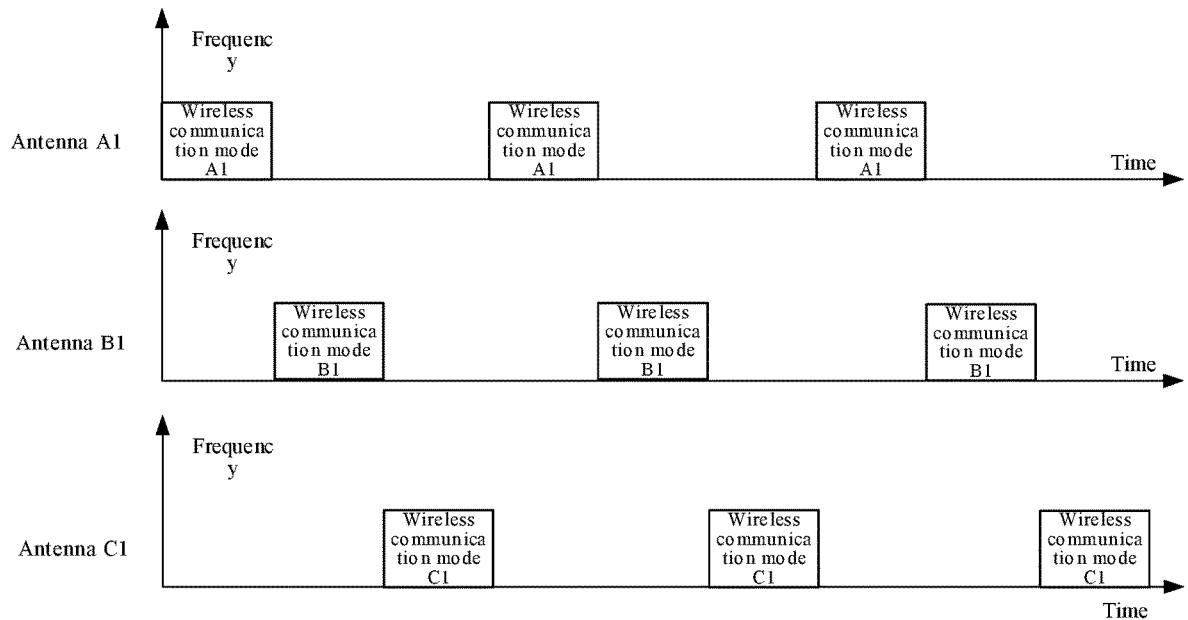
FIG. 7 is a schematic diagram of timeslots in which antennas transceive wireless signals according to an embodiment of the present disclosure.

For example, the impact of the mutual interference between the antenna A1 and the antenna B1 on the wireless signal transceiving of the antenna A1 and the wireless signal transceiving of the antenna B1 exceeds the preset interference upper limit, the impact of the mutual interference between the antenna A1 and the antenna C1 on the wireless signal transceiving of the antenna A1 and the wireless signal transceiving of the antenna C1 exceeds the preset interference upper limit, and the impact of the mutual interference between the antenna B1 and the antenna C1 on the wireless signal transceiving of the antenna B1 and the wireless signal transceiving of the antenna C1 exceeds the preset interference upper limit. As shown in FIG. 7, transceiving the wireless signals in the wireless communication mode A1 through the antenna A1, transceiving the wireless signals in the wireless communication mode B1 through the antenna B1, and transceiving the wireless signals in the wireless communication mode C1 through the antenna C1 are performed in the TDM mode.

Figure 8:
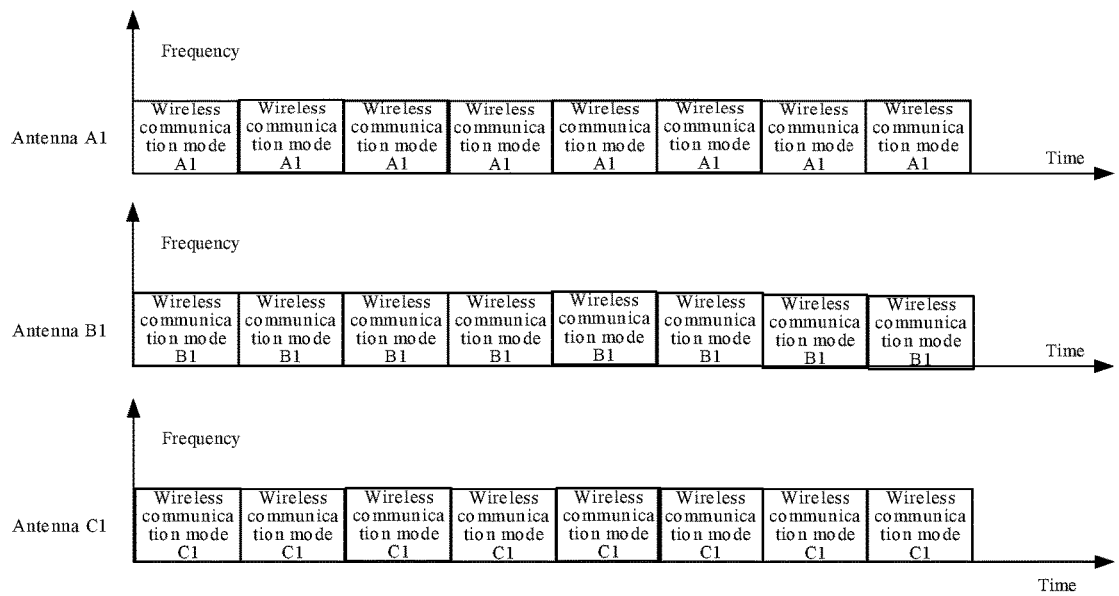
FIG. 8 is a schematic diagram of timeslots in which antennas transceive wireless signals according to an embodiment of the present disclosure.

For example, the impact of the mutual interference between the antenna A1 and the antenna B1 on the wireless signal transceiving of the antenna A1 and the wireless signal transceiving of the antenna B1 does not exceed the preset interference upper limit, the impact of the mutual interference between the antenna A1 and the antenna C1 on the wireless signal transceiving of the antenna A1 and the wireless signal transceiving of the antenna C1 does not exceed the preset interference upper limit, and the impact of the mutual interference between the antenna B1 and the antenna C1 on the wireless signal transceiving of the antenna B1 and the wireless signal transceiving of the antenna C1 does not exceed the preset interference upper limit. As shown in FIG. 8, transceiving the wireless signals in the wireless communication mode A1 through the antenna A1, transceiving the wireless signals in the wireless communication mode B1 through the antenna B1, and transceiving the wireless signals in the wireless communication mode C1 through the antenna C1 are performed in the FDM mode.

Figure 9:
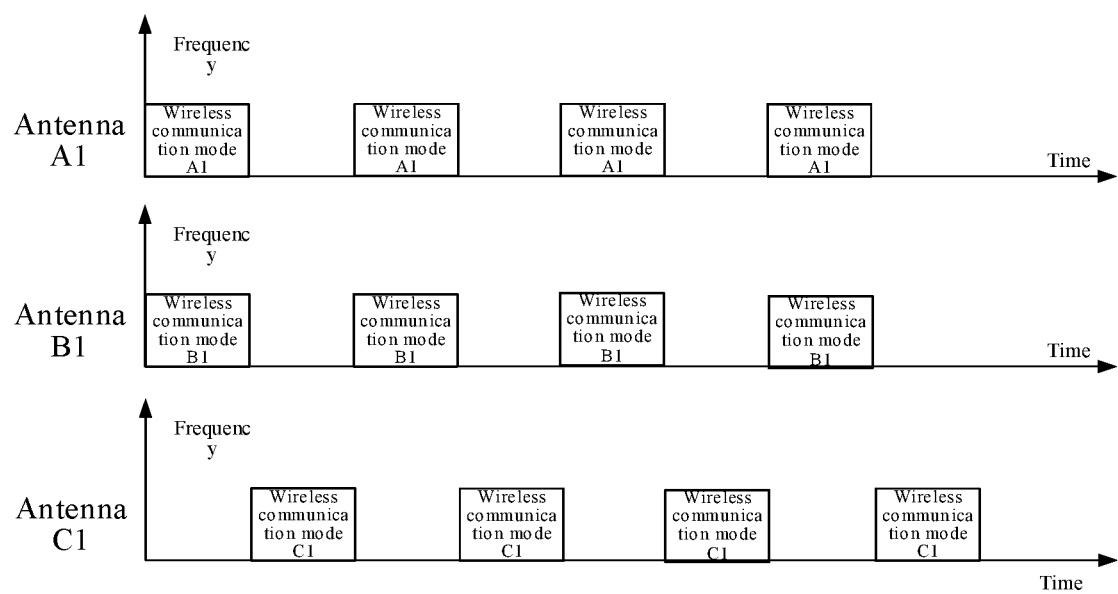
FIG. 9 is a schematic diagram of timeslots in which antennas transceive wireless signals according to an embodiment of the present disclosure.

For example, the impact of the mutual interference between the antenna A1 and the antenna B1 on the wireless signal transceiving of the antenna A1 and the wireless signal transceiving of the antenna B1 does not exceed the preset interference upper limit, the impact of the mutual interference between the antenna A1 and the antenna C1 on the wireless signal transceiving of the antenna A1 and the wireless signal transceiving of the antenna C1 exceeds the preset interference upper limit, and the impact of the mutual interference between the antenna B1 and the antenna C1 on the wireless signal transceiving of the antenna B1 and the wireless signal transceiving of the antenna C1 exceeds the preset interference upper limit. As shown in FIG. 9, transceiving the wireless signals in the wireless communication mode A1 through the antenna A1 and transceiving the wireless signals in the wireless communication mode B through the antenna B1 are performed in the FDM mode, transceiving the wireless signals in the wireless communication mode A1 through the antenna A1 and transceiving the wireless signals in the wireless communication mode C1 through the antenna C1 are performed in the TDM mode, and transceiving the wireless signals in the wireless communication mode B1 through the antenna B1 and transceiving the wireless signals in the wireless communication mode C1 through the antenna C1 are performed in the TDM mode.

Further, in an actual application scenario, a purpose of determining whether the impact of the mutual interference between the antenna A and the antenna B on the wireless signal transceiving of the antenna A and the antenna B exceeds the preset interference upper limit is to determine whether the antenna A and the antenna B need to be isolated from each other (work in TDM mode). A person skilled in the art may use various determining logic to determine whether the impact of the mutual interference between the antenna A and the antenna B on the wireless signal transceiving of the antenna A and the antenna B exceeds the preset interference upper limit. That is, the person skilled in the art may set various parameters based on actual application requirements to determine whether the impact of the mutual interference between the antenna A and the antenna B on the wireless signal transceiving of the antenna A and the antenna B exceeds the preset interference upper limit, and set different parameter values as the preset interference upper limit.

For example, in an embodiment, it is determined based on isolation between the antenna A and the antenna B whether the impact of the mutual interference between the antenna A and the antenna B on the wireless signal transceiving of the antenna A and the antenna B exceeds the preset interference upper limit. Specifically, S200 may be implemented as follows.

The isolation between the antenna A and the antenna B is obtained. In response to a determination that the isolation is lower than a preset isolation threshold, it is determined that the impact of the mutual interference between the antenna A and the antenna B on the wireless signal transceiving of the antenna A and the antenna B exceeds the preset interference upper limit.

For another example, in an embodiment, through determining whether a transmit power of one antenna to transmit a wireless signal affects performance of the other antenna A in receiving a wireless signal, whether impact of mutual interference between the two antennas on the wireless signal transceiving of the two antennas exceeds the preset interference upper limit is determined.

Specifically, S200 may be implemented as follows.

In response to a determination that a transmit power of the antenna A to transmit the wireless signal in the wireless communication mode A affects performance of the antenna B in receiving the wireless signal in the wireless communication mode B or in response to a determination that a transmit power of the antenna B to transmit the wireless signal in the wireless communication mode B affects performance of the antenna A in receiving the wireless signal in the wireless communication mode A, it is determined that the impact of the mutual interference between the antenna A and the antenna B on the wireless signal transceiving of the antenna A and the antenna B exceeds the preset interference upper limit.

Specifically, S200 may be implemented as follows.

The transmit power of the antenna B to transmit the wireless signal in the wireless communication mode B is obtained. In response to a determination that the transmit power of the antenna B to transmit the wireless signal in the wireless communication mode B is greater than or equal to a second power threshold, it is determined that the impact of the mutual interference between the antenna A and the antenna B on the wireless signal transceiving of the antenna A and the antenna B exceeds the preset interference upper limit.

$$P_{max2} = SENS_1 + DENS_{2\text{-}1} + ISO_{ant} \quad (1)$$

$P_{max2}$ represents the second power threshold. $SENS_1$ represents a sensitivity of the antenna A in receiving the wireless signal in the wireless communication mode A. $DENS_{2\text{-}1}$ represents adjacent-channel interference to transceiving the wireless signal in the wireless communication mode A by the antenna A caused by transceiving the wireless signal in the wireless communication mode B by the antenna B. $ISO_{ant}$ represents the isolation between the antenna A and the antenna B.

The transmit power of the antenna A to transmit the wireless signal in the wireless communication mode A is obtained. In response to a determination that the transmit power of the antenna A to transmit the wireless signal in the wireless communication mode A is greater than or equal to a first power threshold, it is determined that the impact of the mutual interference between the antenna A and the antenna B on the wireless signal transceiving of the antenna A and the antenna B exceeds the preset interference upper limit.

$$P_{max1} = SENS_2 + DENS_{1\text{-}2} + ISO_{ant} \quad (2)$$

$P_{max1}$ represents the first power threshold. $SENS_2$ represents a sensitivity of the antenna B in receiving the wireless signal in the wireless communication mode B. $DENS_{2\text{-}1}$ represents adjacent-channel interference to transceiving the wireless signal in the wireless communication mode B by the antenna B caused by transceiving the wireless signal in the wireless communication mode A by the antenna A. $ISO_{ant}$ represents the isolation between the antenna A and the antenna B.

Specifically, in the example embodiment shown in FIG. 1, a transmit power $P_{bt}$ of the antenna 120 to transmit the BT wireless signal, a sensitivity $SENS_{wifi}$ of the antenna 110 in receiving the Wi-Fi wireless signal, adjacent-channel interference $DENS_{bt2wm}$ of transceiving the BT wireless signal by the antenna 120 to transceiving the Wi-Fi wireless signal by the antenna 110, and the isolation $ISO_{ant}$ between the antenna 110 and the antenna 120 are obtained.

In response to a determination that $P_{bt}$ is greater than or equal to $SENS_{wifi} + DENS_{bt2wifi} + ISO_{ant}$, it is determined that the transmit power of the antenna 120 to transmit the BT wireless signal affects performance of the antenna 110 in receiving the Wi-Fi wireless signal and that the impact of the mutual interference between transceiving the BT wireless signal by the antenna 120 and transceiving the Wi-Fi wireless signal by the antenna 110 on the wireless signal transceiving of the antenna A and the antenna B exceeds the preset interference upper limit.

A transmit power $P_{wifi}$ of the antenna 110 to transmit the Wi-Fi wireless signal, a sensitivity $SENS_{bt}$ of the antenna 120 in receiving the BT wireless signal, adjacent-channel interference $DENS_{wifi2bt}$ of the Wi-Fi wireless signal of the antenna 110 to the BT wireless signal of the antenna 120, and the isolation $ISO_{ant}$ between the antenna 110 and the antenna 120 are obtained.

In response to a determination that $P_{wifi}$ is greater than or equal to $SENS_{bt} + DENS_{wifi2bt} + ISO_{ant}$, it is determined that the transmit power of the antenna 110 to transmit the Wi-Fi wireless signal affects performance of the antenna 120 in receiving the BT wireless signal and that the impact of the mutual interference between transceiving the BT wireless signal by the antenna 120 and transceiving the Wi-Fi wireless signal by the antenna 110 on the wireless signal transceiving of the antenna A and the antenna B exceeds the preset interference upper limit.

For another example, in an embodiment, by determining whether a transmit power of an antenna meets a requirement for receiving performance of a receiving apparatus, whether impact of mutual interference between two antennas on wireless signal transceiving of the two antennas exceeds the preset interference upper limit is determined. Specifically, in response to a determination that a transmit power of an antenna does not meet a requirement for receiving performance of a receiving apparatus, it is determined that impact of mutual interference between the antenna and another antenna on wireless signal transceiving of the antennas exceeds the preset interference upper limit. It can be further determined that the impact of the mutual interference between the two antennas on the wireless signal transceiving of the two antennas exceeds the preset interference upper limit.

Specifically, S200 is implemented as follows.

In response to a determination that the transmit power of the antenna A to transmit the wireless signal in the wireless communication mode A does not meet a requirement for performance of a device A in receiving the wireless signal in the wireless communication mode A or in response to a determination that the transmit power of the antenna B to transmit the wireless signal in the wireless communication mode B does not meet a requirement for performance of a device B in receiving the wireless signal in the wireless communication mode B, it is determined that the impact of the mutual interference between the antenna A and the antenna B on the wireless signal transceiving of the antenna A and the antenna B exceeds the preset interference upper limit. The device A is a device (for example, a Wi-Fi hotspot device wirelessly connected to the antenna A based on Wi-Fi) that transceives the wireless signal in the wireless communication mode A with the antenna A. The device B is a device (for example, a BT speaker wirelessly connected to the antenna B based on BT) that transceives the wireless signal in the wireless communication mode B with the antenna B.

Specifically, in an embodiment, the antenna A is configured to receive a first wireless signal in the wireless communication mode A, and the antenna B is configured to receive a second wireless signal in the wireless communication mode B.

S200 may be implemented as follows.

A signal strength of the wireless signal in the wireless communication mode A received by the antenna A is obtained. In response to a determination that the signal strength of the wireless signal in the wireless communication mode A received by the antenna A is less than or equal to a first signal strength threshold, it is determined that the impact of the mutual interference between the antenna A and the antenna B on the wireless signal transceiving of the antenna A and the antenna B exceeds the preset interference upper limit.

$$RSSI_{max1} = SENS_1 + TXPWR_1 - P_1 \quad (3)$$

$RSSI_{max1}$ represents the first signal strength threshold. $SENS_1$ represents the sensitivity of the antenna A in receiving the wireless signal in the wireless communication mode A. $TXPWR_1$ represents a transmit power of the first wireless signal. $P_1$ represents the transmit power of the antenna A to transmit the wireless signal in the wireless communication mode A.

A signal strength of the wireless signal in the wireless communication mode B received by the antenna B is obtained. In response to a determination that the signal strength of the wireless signal in the wireless communication mode B received by the antenna B is less than or equal to a second signal strength threshold, it is determined that the impact of the mutual interference between the antenna A and the antenna B on the wireless signal transceiving of the antenna A and the antenna B exceeds the preset interference upper limit.

$$RSSI_{max2} = SENS_2 + TXPWR_2 - P_2 \quad (4)$$

$RSSI_{max1}$ represents the second signal strength threshold. $SENS_2$ represents the sensitivity of the antenna B in receiving the wireless signal in the wireless communication mode B. $TXPWR_2$ represents a transmit power of the second wireless signal. $P_2$ represents the transmit power of the antenna B to transmit the wireless signal in the wireless communication mode B.

Specifically, in the example embodiment shown in FIG. 1, the transmit power $P_{wifi}$ of the antenna 110 to transmit the Wi-Fi wireless signal, a signal strength $RSSI_{wifi}$ of the Wi-Fi wireless signal received by the antenna 110, the sensitivity $SENS_{wifi}$ of the antenna 110 in receiving the Wi-Fi wireless signal, and a transmit power $TXPWR_{ap}$ of the wireless hotspot apparatus 101 are obtained.

In response to a determination that $RSSI_{wifi}$ is less than or equal to $SENS_{wifi} + TXPWR_{ap} - P_{wifi}$, it is determined that the transmit power of the antenna 110 to transmit the Wi-Fi wireless signal does not meet a requirement for performance of the wireless hotspot apparatus 101 in receiving the Wi-Fi wireless signal and that the impact of the mutual interference between transceiving the BT wireless signal by the antenna 120 and transceiving the Wi-Fi wireless signal by the antenna 110 on the wireless signal transceiving of the antenna A and the antenna B exceeds the preset interference upper limit.

The transmit power $P_{bt}$ of the antenna 120 to transmit the BT wireless signal, the signal strength $RSSI_{bt}$ of the BT wireless signal received by the antenna 120, the sensitivity $SENS_{bt}$ of the antenna 120 in receiving the BT wireless signal, and a transmit power $TXPWR_{earphone}$ of the BT headset 102 are obtained.

In response to a determination that $RSSI_{bt}$ is less than or equal to $SENS_{bt} + TXPWR_{earphone} - P_{bt}$, it is determined that the transmit power of the antenna 120 to transmit the BT wireless signal does not meet a requirement for performance of the BT headset 102 in receiving the BT wireless signal and that the impact of the mutual interference between transceiving the BT wireless signal by the antenna 120 and transceiving the Wi-Fi wireless signal by the antenna 110 on the wireless signal transceiving of the antenna A and the antenna B exceeds the preset interference upper limit.

Further, in an actual application scenario, various determining logic may be integrated to determine whether the impact of the mutual interference between the antenna A and the antenna B on the wireless signal transceiving of the antenna A and the antenna B exceeds the preset interference upper limit. For example, a plurality of determining criteria are set. Each determining criterion corresponds to a piece of determining logic. It is determined that the impact of the mutual interference between the antenna A and the antenna B on the wireless signal transceiving of the antenna A and the antenna B does not exceed the preset interference upper limit only when all determining criteria are satisfied. If any one of the determining criteria is not satisfied, it is determined that the impact of the mutual interference between the antenna A and the antenna B on the wireless signal transceiving of the antenna A and the antenna B exceeds the preset interference upper limit.

The application scenario shown in FIG. 1 is used as an example. The mobile phone obtains the isolation $ISO_{ant}$ between the antenna 110 and the antenna 120, the sensitivity $SENS_{wifi}$ of the antenna 110 in receiving the Wi-Fi wireless signal, the sensitivity $SENS_{bt}$ of the antenna 120 in receiving the BT wireless signal, the adjacent-channel interference $DENS_{wifi2bt}$ of transceiving the Wi-Fi wireless signal by the antenna 110 to transceiving the BT wireless signal by the antenna 120, the adjacent-channel interference $DENS_{bt2wifi}$ of transceiving the BT wireless signal by the antenna 120 to transceiving the Wi-Fi wireless signal by the antenna 110, the signal strength $RSSI_{bt}$ of the BT wireless signal received by the antenna 120, the signal strength $RSSI_{wifi}$ of the Wi-Fi wireless signal received by the antenna 110, the transmit power $P_{bt}$ of the antenna 120 to transmit the BT wireless signal, the transmit power $P_{wifi}$ of the antenna 110 to transmit the Wi-Fi wireless signal, the transmit power $TXPWR_{earphone}$ of the BT headset 102 to transmit the BT wireless signal, and the transmit power $TXPWR_{ap}$ of the wireless hotspot apparatus 101 to transmit the Wi-Fi wireless signal.

Figure 10:
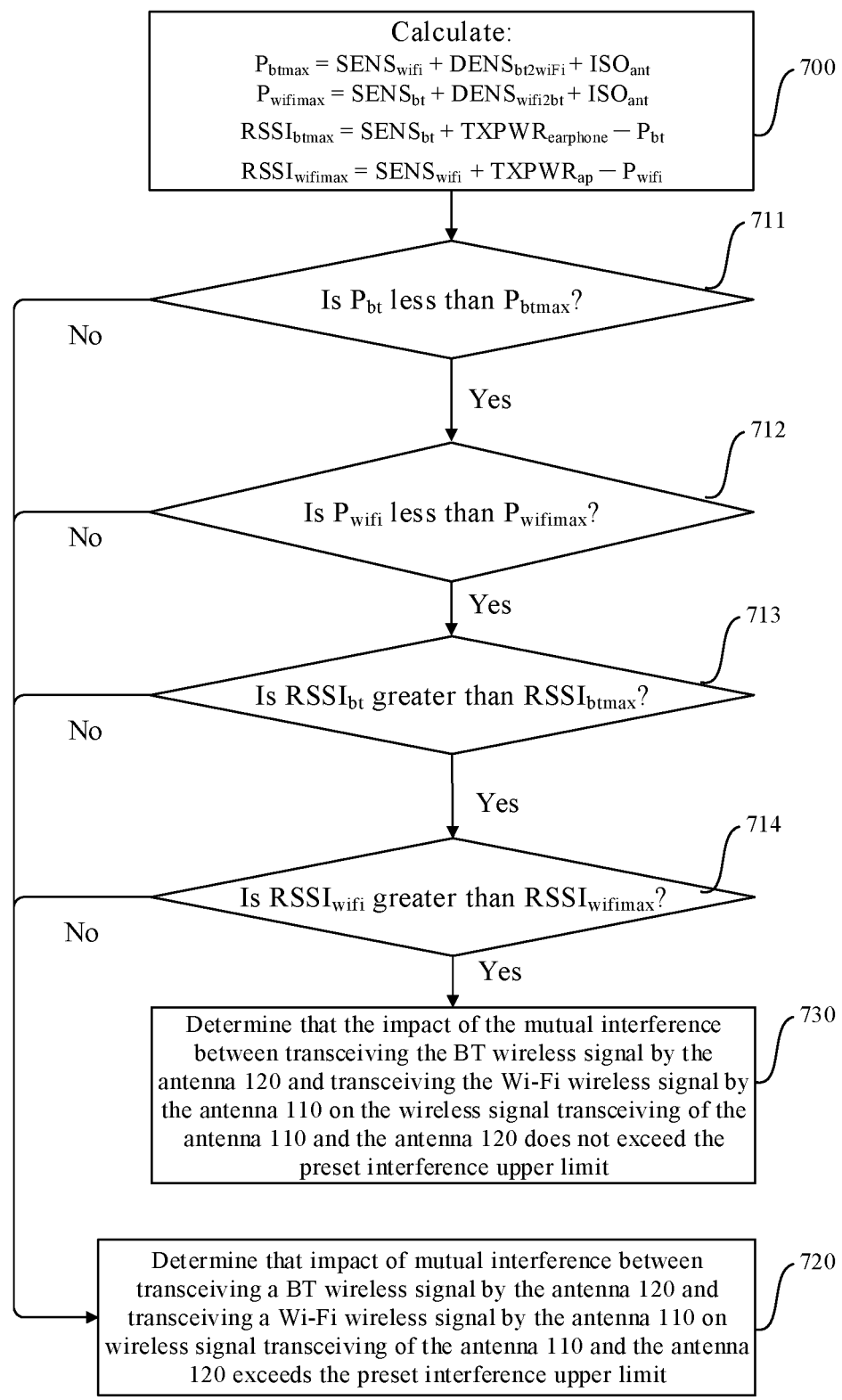
FIG. 10 is a flowchart of a partial method according to an embodiment of the present disclosure.

FIG. 10 is a flowchart of a partial method according to an embodiment of the present disclosure. In an embodiment, S200 includes the following steps shown in FIG. 7.

At S700, the following formulas are calculated.

$$P_{btmax}=SENS_{wifi}+DENS_{bt2wiFi}+ISO_{ant} \quad (5)$$

$$P_{wifimax}=SENS_{bt}+DENS_{wifi2bt}+ISO_{ant} \quad (6)$$

$$RSSI_{btmax}=SENS_{bt}+TXPWR_{earphone}-P_{bt} \quad (7)$$

$$RSSI_{wifimax}=SENS_{wifi}+TXPWR_{ap}-P_{wifi} \quad (8)$$

At S711, it is determined whether $P_{bt}$ is less than $P_{btmax}$.

In response to a determination that $P_{bt}$ is not less than $P_{btmax}$, S720 is performed. In response to a determination that $P_{bt}$ is less than $P_{btmax}$, S712 is performed.

At S712, it is determined whether $P_{wifi}$ is less than $P_{wifimax}$.

In response to a determination that $P_{wifi}$ is not less than $P_{wifimax}$, S720 is performed. In response to a determination that $P_{wifi}$ is less than $P_{wifimax}$, S713 is performed.

At S713, it is determined whether $RSSI_{bt}$ is greater than $RSSI_{btmax}$.

In response to a determination that $RSSI_{bt}$ is not greater than $RSSI_{btmax}$, S720 is performed. In response to a determination that $RSSI_{bt}$ is greater than $RSSI_{btmax}$, S714 is performed.

At S714, it is determined whether $RSSI_{wifi}$ is greater than $RSSI_{wifimax}$.

In response to a determination that $RSSI_{wifi}$ is not greater than $RSSI_{wifimax}$, S720 is performed. In response to a determination that $RSSI_{wifi}$ is greater than $RSSI_{wifimax}$, S730 is performed.

At S720, it is determined that the impact of the mutual interference between transceiving the BT wireless signal by the antenna 120 and transceiving the Wi-Fi wireless signal by the antenna 110 on the wireless signal transceiving of the antenna 110 and the antenna 120 exceeds the preset interference upper limit.

At S730, it is determined that the impact of the mutual interference between transceiving the BT wireless signal by the antenna 120 and transceiving the Wi-Fi wireless signal by the antenna 110 on the wireless signal transceiving of the antenna A and the antenna B does not exceed the preset interference upper limit.

Further, in some actual application scenarios, a transmit power of an antenna is adjustable. Therefore, in an embodiment of the present disclosure, in response to a preliminary determination that impact of mutual interference between two antennas on wireless signal transceiving of the two antennas exceeds the preset interference upper limit, transmit powers of the antennas may be adjusted such that the impact of the mutual interference between the two antennas on the wireless signal transceiving of the two antennas does not exceed the preset interference upper limit.

For example, in a process of implementing S200, in response to a determination that a transmit power of one antenna to transmit a wireless signal affects performance of the other antenna A in receiving a wireless signal, it is not immediately determined that impact of mutual interference between the two antennas on wireless signal transceiving of the two antennas exceeds the preset interference upper limit. The transmit power of the antenna to transmit the wireless signal is adjusted such that the transmit power of the antenna to transmit the wireless signal does not affect the performance of the other antenna in receiving the wireless signal.

Specifically, S 200 may be implemented as follows.

In response to a determination that the transmit power of the antenna A to transmit the wireless signal in the wireless communication mode A affects the performance of the antenna B in receiving the wireless signal in the wireless communication mode B, the transmit power of the antenna A to transmit the wireless signal in the wireless communication mode A is adjusted such that the transmit power of the antenna A to transmit the wireless signal in the wireless communication mode A does not affect the performance of the antenna B in receiving the wireless signal in the wireless communication mode B, and/or, in response to a determination that the transmit power of the antenna B to transmit the wireless signal in the wireless communication mode B affects the performance of the antenna A in receiving the wireless signal in the wireless communication mode A, the transmit power of the antenna B to transmit the wireless signal in the wireless communication mode B is adjusted such that the transmit power of the antenna B to transmit the wireless signal in the wireless communication mode B does not affect the performance of the antenna A in receiving the wireless signal in the wireless communication mode A.

Specifically, S200 may be implemented as follows.

In response to a determination that the transmit power of the antenna A to transmit the wireless signal in the wireless communication mode A does not meet the requirement for the performance of the device A in receiving the wireless signal in the wireless communication mode A, the transmit power of the antenna A to transmit the wireless signal in the wireless communication mode A is adjusted such that the transmit power of the antenna A to transmit the wireless signal in the wireless communication mode A meets the requirement for the performance of the device A in receiving the wireless signal in the wireless communication mode A.

Alternatively, in response to a determination that the transmit power of the antenna B to transmit the wireless signal in the wireless communication mode B does not meet the requirement for the performance of the device B in receiving the wireless signal in the wireless communication mode B, the transmit power of the antenna B to transmit the wireless signal in the wireless communication mode B is adjusted such that the transmit power of the antenna B to transmit the wireless signal in the wireless communication mode B meets the requirement for the performance of the device B in receiving the wireless signal in the wireless communication mode B.

Further, in response to a determination that the impact of the mutual interference between the two antennas on the wireless signal transceiving of the two antennas still exceeds the preset interference upper limit after the transmit power of the antenna A to transmit the wireless signal in the wireless communication mode A has reached an adjustment upper/lower limit, it is determined that the impact of the mutual interference between the antenna A and the antenna B on the wireless signal transceiving of the antenna A and the antenna B exceeds the preset interference upper limit For example, in response to a determination that the transmit power of the antenna A to transmit the wireless signal in the wireless communication mode A still affects the performance of the antenna B in receiving the wireless signal in the wireless communication mode B after the transmit power of the antenna A to transmit the wireless signal in the wireless communication mode A has reached the adjustment upper/lower limit, it is determined that the impact of the mutual interference between the antenna A and the antenna B on the wireless signal transceiving of the antenna A and the antenna B exceeds the preset interference upper limit.

Alternatively, in response to a determination that the transmit power of the antenna B to transmit the wireless signal in the wireless communication mode B still affects the performance of the antenna A in receiving the wireless signal in the wireless communication mode A after the transmit power of the antenna B to transmit the wireless signal in the wireless communication mode B has reached the adjustment upper/lower limit, it is determined that the impact of the mutual interference between the antenna A and the antenna B on the wireless signal transceiving of the antenna A and the antenna B exceeds the preset interference upper limit.

Alternatively, in response to a determination that the transmit power of the antenna A to transmit the wireless signal in the wireless communication mode A still does not meet the requirement for the performance of the device A in receiving the wireless signal in the wireless communication mode A after the transmit power of the antenna A to transmit the wireless signal in the wireless communication mode A has reached the adjustment upper/lower limit, it is determined that the impact of the mutual interference between the antenna A and the antenna B on the wireless signal transceiving of the antenna A and the antenna B exceeds the preset interference upper limit.

Alternatively, in response to a determination that the transmit power of the antenna B to transmit the wireless signal in the wireless communication mode B still does not meet the requirement for the performance of the device B in receiving the wireless signal in the wireless communication mode B after the transmit power of the antenna B to transmit the wireless signal in the wireless communication mode B has reached the adjustment upper/lower limit, it is determined that the impact of the mutual interference between the antenna A and the antenna B on the wireless signal transceiving of the antenna A and the antenna B exceeds the preset interference upper limit.

Further, in an embodiment, the signal strengths of the wireless signals received by the antennas are used to determine whether the impact of the mutual interference between the antennas on the wireless signal transceiving of the two antennas exceeds the preset interference upper limit. For example, S200 may be implement as follows.

A first signal strength of the wireless signal in the wireless communication mode A received by the antenna A is obtained.

A second signal strength of the wireless signal in the wireless communication mode B received by the antenna B is obtained.

In response to a determination that the first signal strength is less than a first strength threshold or in response to a determination that the second signal strength is less than a second strength threshold, it is determined that the impact of the mutual interference between the antenna A and the antenna B on the wireless signal transceiving of the antenna A and the antenna B exceeds the preset interference upper limit.

In response to a determination that the first signal strength is less than a third strength threshold and the second signal strength is less than a fourth strength threshold, it is determined that the impact of the mutual interference between the antenna A and the antenna B on the wireless signal transceiving of the antenna A and the antenna B exceeds the preset interference upper limit. The third strength threshold is greater than the first strength threshold. The fourth strength threshold is greater than the second strength threshold.

In response to a determination that the first signal strength is less than a fifth strength threshold and the second signal strength is less than a sixth strength threshold, it is determined that the impact of the mutual interference between the antenna A and the antenna B on the wireless signal transceiving of the antenna A and the antenna B exceeds the preset interference upper limit. The fifth strength threshold is greater than the third strength threshold. The sixth strength threshold is greater than the fourth strength threshold.

Figure 11:
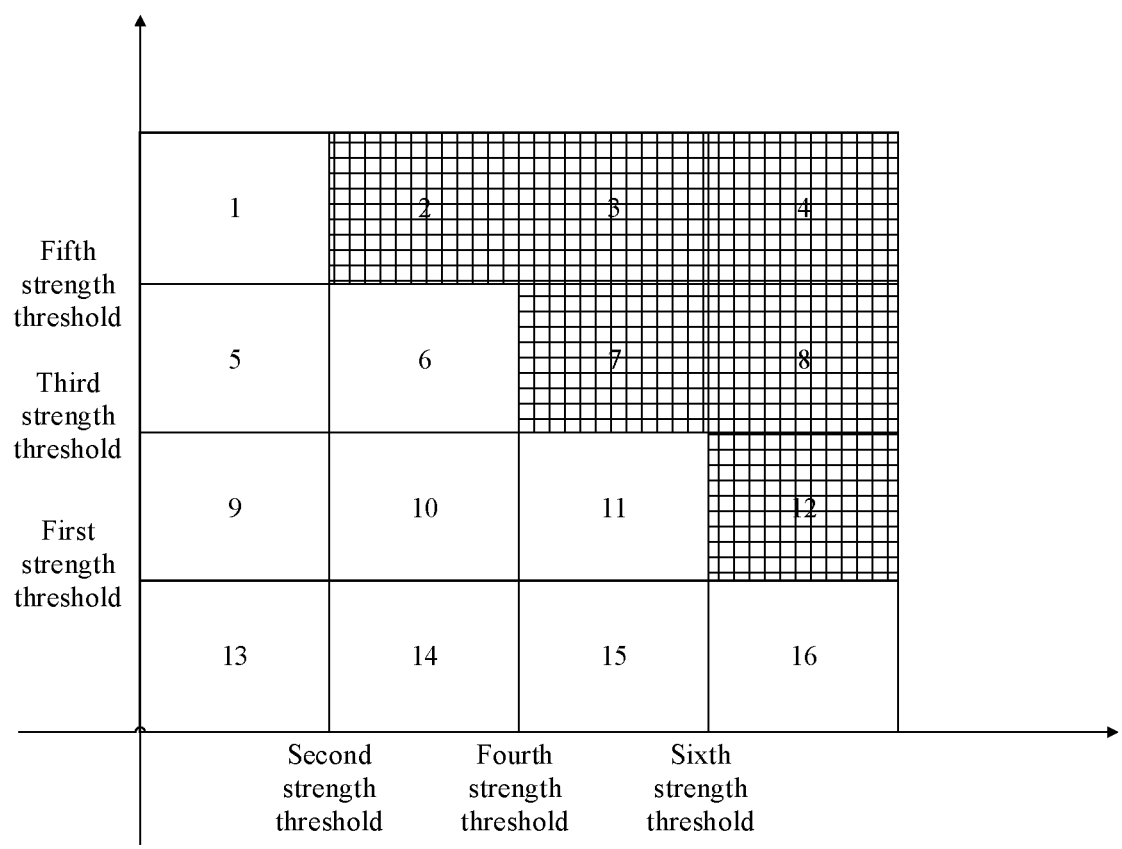
FIG. 11 is a coordinate diagram of determining a signal strength of a wireless signal according to an embodiment of the present disclosure.

FIG. 11 is a coordinate diagram of determining a signal strength of a wireless signal according to an embodiment of the present application. As shown in FIG. 11, the ordinate represents the first signal strength of the wireless signal in the wireless communication mode A received by the antenna A, and the abscissa represents the second signal strength of the wireless signal in the wireless communication mode B received by the antenna B.

As shown in FIG. 11, in response to a determination that the first signal strength of the wireless signal in the wireless communication mode A received by the antenna A and the second signal strength of the wireless signal in the wireless communication mode B received by the antenna B are located within blocks 1, 5, 6, 9, 10, 11, 13, 14, 15, and 16, it may be determined that the impact of the mutual interference between the antenna A and the antenna B on the wireless signal transceiving of the antenna A and the antenna B exceeds the preset interference upper limit.

In response to a determination that the first signal strength of the wireless signal in the wireless communication mode A received by the antenna A and the second signal strength of the wireless signal in the wireless communication mode B received by the antenna B are located within blocks 2, 3, 4, 7, 8, and 12, it may be determined that the impact of the mutual interference between the antenna A and the antenna B on the wireless signal transceiving of the antenna A and the antenna B does not exceed the preset interference upper limit.

Further, in the 1990s, an improvement of a technology may be clearly classified into a hardware improvement (for example, an improvement of a circuit structure such as a diode, a transistor, or a switch) or a software improvement (an improvement of a method process). However, with the development of technologies, improvements in many method processes today can be considered as direct improvements in hardware circuit structures. Design personnel almost all obtain a corresponding hardware circuit structure by programming an improved method process to a hardware circuit. Therefore, an improvement of a method process can be implemented by hardware entity modules. For example, a programmable logic device (Programmable Logic Device, PLD) (for example, a field programmable gate array (Field Programmable Gate Array, FPGA)) is such an integrated circuit, and a logic function of the programmable logic device is determined by an accessing party by programming a device. The design personnel program to "integrate" a digital apparatus into one PLD without a need for a chip manufacturer to design and manufacture an application-specific integrated circuit chip. In addition, today, instead of manually making an integrated circuit chip, such programming is also mostly implemented by using "logic compiler (logic compiler)" software. The "logic compiler" software is similar to a software compiler used during program development and writing, and original code to be compiled is also written in a specific programming language that is referred to as a hardware description language (Hardware Description Language, HDL). The HDL does not have merely one type, but has a plurality of types, such as an ABEL (Advanced Boolean Expression Language), an AHDL (Altera Hardware Description Language), Confluence, a CUPL (Cornell University Programming Language), HDCal, a JHDL (Java Hardware Description Language), Lava, Lola, MyHDL, PALASM, and an RHDL (Ruby Hardware Description Language). Currently, a VHDL (Very-High-Speed Integrated Circuit Hardware Description Language) and Verilog are most commonly used currently. A person skilled in the art should also be aware that, a hardware circuit that implements a logic method process can be easily obtained provided that logic programming is slightly performed on the method process by using the foregoing several hardware description languages and the method process is programmed into an integrated circuit.

Specifically, based on the method in the embodiments of the present application, an embodiment of the present disclosure further provides a device for communication. The device includes: an interference determining module and an antenna allocation module.

The interference determining module is configured to determine whether impact of mutual interference between an antenna A and an antenna B on wireless signal transceiving of the antenna A and wireless signal transceiving of the antenna B exceeds a preset interference upper limit, where the antenna A is configured to transceive a wireless signal in a wireless communication mode A, and the antenna B is configured to transceive a wireless signal in a wireless communication mode B.

The antenna allocation module is configured to, in response to a determination that the impact of the mutual interference between the antenna A and the antenna B on the wireless signal transceiving of the antenna A and the antenna B exceeds the preset interference upper limit, transceive the wireless signal in the wireless communication mode A through the antenna A and transceive the wireless signal in the wireless communication mode B through the antenna B.

Transceiving of the wireless signal in the wireless communication mode A through the antenna A and transceiving of the wireless signal in the wireless communication mode B through the antenna B are performed in the TDM mode.

In the description of the embodiments of this disclosure, for ease of description, when the device is described, the functions are divided into various modules and described respectively, and division to the modules is merely division of logical functions. The functions of the modules are implemented in the same or a plurality of software and/or hardware.

Specifically, the device proposed in the embodiments of the present disclosure may be fully or partially integrated into a physical entity or may be physically separate. These modules may be all implemented in a form of software through processing element calling; may be all implemented in a form of hardware; or may be partially implemented in a form of software through processing element calling, and partially implemented in a form of hardware. For example, a detection module may be a separate processing element or integrated into a chip of an electronic device. Implementation of other modules is similar. In addition, all or part of these modules may be integrated or implemented independently. During the implementation, each step or module of the foregoing methods may be implemented by an integrated logic circuit of hardware in a processing element or by using an instruction in a form of software.

For example, the foregoing modules may be one or more integrated circuits configured to implement the foregoing methods, such as one or more application-specific integrated circuits (ASICs), one or more digital signal processors (DSPs), or one or more field-programmable gate arrays (FPGAs). For another example, these modules may be integrated and implemented in a form of a system-on-a-chip (SOC).

For example, the device for communication provided in the embodiments of the present disclosure may be an antenna control module in a communication system. The antenna control module is connected to a first antenna, a second antenna, and a wireless communication module. The antenna control module is configured to adjust a mode in which wireless signal transceiving of the first antenna and the second antenna is performed. Further, the wireless communication module may be a set of a plurality of wireless communication chips (for example, a Wi-Fi wireless communication chip and a BT wireless communication chip). The wireless communication module may alternatively be a single communication chip integrating a plurality of wireless communication systems (for example, a wireless communication chip integrating Wi-Fi and BT).

Further, the antenna control module may be constructed separately from the wireless communication module. For example, an independent antenna configuration chip is constructed. The antenna configuration chip is configured to adjust a mode in which the wireless signal transceiving of the first antenna and the second antenna is performed.

Further, the antenna control module may alternatively be constructed in the wireless communication module, for example, in a wireless communication chip integrating Wi-Fi and BT. Function code of the antenna control module is loaded to construct the antenna control module.

For example, the embodiments of the present disclosure further provide a wireless communication chip. The wireless communication chip is configured to transceive a wireless signal in a first mode and a wireless signal in a second mode. The wireless communication chip is connected to the first antenna and the second antenna. The wireless communication chip includes a processor.

The processor is configured to execute computer program instructions stored in a memory. When the computer program instructions are executed by the processor of the electronic chip, the wireless communication chip is caused to perform the method according to the embodiments of the present disclosure to transceive wireless signals through the first antenna and the second antenna.

An embodiment of the present disclosure further provides an electronic device. The electronic device includes a first antenna, a second antenna, and a wireless communication chip. The wireless communication chip includes a memory configured to store computer program instructions and a processor configured to execute the computer program instructions. When the computer program instructions are executed by the processor, the electronic device is caused to perform the method according to the embodiments of the present disclosure through the first antenna and the second antenna.

Specifically, in an embodiment of the present disclosure, the one or more computer programs are stored in the memory, and the one or more computer programs include instructions. When the instructions are executed by the device, the device is caused to perform the methods described in the embodiments of the present disclosure.

Specifically, in an embodiment of the present disclosure, the processor of the electronic device may be an SOC. The processor may include a central processing unit (CPU), and may further include a processor of another type. Specifically, in an embodiment of the present disclosure, the processor of the electronic device may be a PWM control chip.

Specifically, in an embodiment of the present disclosure, the processor may include, for example, a CPU, a DSP, a microcontroller, or a digital signal processor, and may further include a GPU, an embedded neural network processing unit (NPU), and an image signal processor (ISP). The processor may further include a necessary hardware accelerator, a logic processing hardware circuit such as an ASIC, or one or more integrated circuits for controlling the execution of the program of the technical solutions of the present disclosure. In addition, the processor may have a function of operating one or more software programs, and the software program may be stored in a storage medium.

Specifically, in an embodiment of the present disclosure, the memory of the electronic device may be a read-only memory (ROM), another type of static storage device that can store static information and instructions, a random access memory (RAM), or another type of dynamic storage device that can store information and instructions; may be an electrically erasable programmable read-only memory (EE-PROM), a compact disc read-only memory (CD-ROM), another optical disc storage, an optical disc storage (including a compact disc, a laser disc, an optical disc, a digital versatile disc, or a Blu ray disc), a disk storage medium, or another magnetic storage device; or may be any computer-readable medium that can be used to carry or store desired program code in a form of an instruction or a data structure and can be accessed by a computer.

Specifically, in an embodiment of the present disclosure, the processor and the memory may be integrated into a processing apparatus. More generally, the processor and the memory are independent components. The processor is configured to execute the program code stored in the memory to implement the methods described in the embodiments of the present disclosure. During specific implementation, the memory may alternatively be integrated into the processor or independent of the processor.

Further, the devices, apparatus, and modules described in the embodiments of the present disclosure may be specifically implemented by a computer chip or entity, or implemented by a product with a specific function.

Those skilled in the art should understand that the embodiments of the present disclosure may be provided as a method, an apparatus, or a computer program product. Therefore, the present disclosure may use a form of hardware only embodiments, software only embodiments, or embodiments with a combination of software and hardware. Moreover, the present disclosure may be in a form of a computer program product that is implemented on one or more computer-usable storage media that include computer-usable program code.

In the embodiments provided in the present disclosure, if implemented in a form of a software functional unit and sold or used as a stand-alone product, any function may be stored in a computer-readable storage medium. Based on this understanding, the technical solution of the present disclosure essentially, or a part contributing to the prior art, or some of the technical solutions may be embodied in a form of a software product. The computer software product is stored on a storage medium, and includes several instructions to enable a computer device (which may be a personal computer, a server, a network device, or the like) to execute all or some steps of the methods according to the embodiments of the present disclosure.

Specifically, an embodiment of the present disclosure provides a computer-readable storage medium. The computer-readable storage medium stores a computer program. When the computer program runs on a computer, the computer executes the methods provided in the embodiments of the present disclosure.

An embodiment of the present disclosure provides a computer program product. The computer program product includes a computer program. When the computer program runs on a computer, the computer executes of the methods provided in the embodiments of the present disclosure.

The embodiments of the present disclosure are described with reference to the flowcharts and/or block diagrams of the method, the device (apparatus), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, such that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct a computer or another programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It should be noted that, in the embodiments of the present disclosure, the term "at least one" refers to one or more, and the term "a plurality of" refers to two or more. The term "and/or" describes associations between associated objects, and it indicates three types of relationships. For example, "A and/or B" may indicate that A exists alone, A and B coexist, or B exists alone. "A" and "B" each may be singular or plural. The character "/" generally indicates that the associated objects are in an "or" relationship. The term "at least one of the followings" or a similar expression refers to any combination of these items, including any combination of single items or plural items. For example, at least one of a, b, and c may represent: a, b, c, a and b, a and c, b and c, or a, b, and c, where a, b, and c may be singular or plural.

In addition, terms "include", "comprise", or any other variations thereof are intended to cover non-exclusive inclusion, such that a process, method, product, or device including a series of elements not only includes those elements, but also includes other elements that are not explicitly listed, or also includes inherent elements of the process, method, product, or device. Without more restrictions, an element defined by the phrase "including a . . ." does not exclude the presence of another same element in a process, method, product, or device that includes the element.

The present disclosure may be described in general contexts of computer executable instructions executed by a computer, such as a program module. Generally, the program module includes a routine, a program, an object, a component, a data structure, and the like that perform specific tasks or implement specific abstract data types. The present disclosure may alternatively be practiced in a distributed computing environment in which a task is performed by a remote processing device connected through a communication network. In the distributed computing environment, the program module may be located in local and remote computer storage media including a storage device.

The embodiments in the present disclosure are described in a progressive manner. For same or similar parts between the embodiments, reference may be made to each other. Each embodiment focuses on a difference from other embodiments. For an apparatus embodiment, since it is basically similar to the method embodiment, the description is relatively simple, and reference can be made to the description of the method embodiment.

Those of ordinary skill in the art may be aware that units and algorithm steps described in the embodiments of the present disclosure can be implemented by electronic hardware or a combination of computer software and electronic hardware. Whether these functions are implemented in hardware or software depends on specific applications of the technical solutions and design constraints. A person skilled in the art may use different methods to implement the described functions for each specific application, but such implementation should not be considered to be beyond the scope of the present disclosure.

A person skilled in the art can clearly understand that, for convenience and brevity of description, reference may be made to corresponding processes in the foregoing method embodiment for specific working processes of the foregoing apparatuses and units. Details are not described herein again.

The above merely describes specific implementations of the present disclosure. Any person skilled in the art can easily conceive modifications or replacements within the technical scope of the present disclosure, and these modifications or replacements shall fall within the protection scope of the present disclosure. Therefore, the protection scope of the present disclosure should be subject to the protection scope of the claims.

What is claimed is:

1. A method for communication comprising:

determining whether an impact of mutual interference between a first antenna and a second antenna on a wireless signal transceiving of the first antenna and the second antenna exceeds a preset interference upper limit, wherein the first antenna is configured to transceive a first-mode wireless signal and the second antenna is configured to transceive a second-mode wireless signal; and in response to a determination that the impact of the mutual interference between the first antenna and the second antenna on the wireless signal transceiving of the first antenna and the second antenna exceeds the preset interference upper limit, transceiving the first-mode wireless signal through the first antenna and transceiving the second-mode wireless signal through the second antenna, wherein the transceiving of the first-mode wireless signal through the first antenna and the transceiving of the second-mode wireless signal through the second antenna are performed in a time-division multiplexing (TDM) mode, and wherein the determining whether the impact of the mutual interference between the first antenna and the second antenna on the wireless signal transceiving of the first antenna and the second antenna exceeds the preset interference upper limit comprises:

obtaining a first signal strength of the first-mode wireless signal received by the first antenna;

obtaining a second signal strength of the second-mode wireless signal received by the second antenna;

in response to a determination that the first signal strength is less than a first strength threshold or in response to a determination that the second signal strength is less than a second strength threshold, determining that the impact of the mutual interference between the first antenna and the second antenna on the wireless signal transceiving of the first antenna and the second antenna exceeds the preset interference upper limit;

in response to a determination that the first signal strength is less than a third strength threshold and the second signal strength is less than a fourth strength threshold, determining that the impact of the mutual interference between the first antenna and the second antenna on the wireless signal transceiving of the first antenna and the second antenna exceeds the preset interference upper limit, wherein the third strength threshold is greater than the first strength threshold and the fourth strength threshold is greater than the second strength threshold; and in response to a determination that the first signal strength is less than a fifth strength threshold and the second signal strength is less than a sixth strength threshold, determining that the impact of the mutual interference between the first antenna and the second antenna on the wireless signal transceiving of the first antenna and the second antenna exceeds the preset interference upper limit, wherein the fifth strength threshold is greater than the third strength threshold and the sixth strength threshold is greater than the fourth strength threshold.

2. The method according to claim 1, further comprising:
in response to a determination that the impact of the mutual interference between the first antenna and the second antenna on the wireless signal transceiving of the first antenna and the second antenna does not exceed the preset interference upper limit, transceiving the first-mode wireless signal through the first antenna and transceiving the second-mode wireless signal through the second antenna,
wherein the transceiving of the first-mode wireless signal through the first antenna and the transceiving of the second-mode wireless signal through the second antenna are performed in a frequency-division multiplexing (FDM) mode.

3. The method according to claim 1, wherein the second antenna is further configured to transceive the first-mode wireless signal, and the method further comprises:
in response to a determination that the impact of the mutual interference between the first antenna and the second antenna on the wireless signal transceiving of the first antenna and the second antenna does not exceed the preset interference upper limit, transceiving the first-mode wireless signal through the first antenna, and transceiving the first-mode wireless signal and the second-mode wireless signal through the second antenna,
wherein the transceiving of the first-mode wireless signal through the first antenna and the transceiving of the second-mode wireless signal through the second antenna are performed in a frequency-division multiplexing (FDM) mode, and
wherein the transceiving of the first-mode wireless signal through the second antenna and the transceiving of the second-mode wireless signal through the second antenna are performed in the TDM mode.

4. The method according to claim 1, wherein the second antenna is further configured to transceive the first-mode wireless signal, and the method further comprises:
in response to the determination that the impact of the mutual interference between the first antenna and the second antenna on the wireless signal transceiving of the first antenna and the second antenna exceeds the preset interference upper limit, transceiving the first-mode wireless signal through the first antenna and transceiving the first-mode wireless signal and the second-mode wireless signal through the second antenna,
wherein the transceiving of the first-mode wireless signal through the first antenna and the transceiving of the second-mode wireless signal through the second antenna are performed in the TDM mode, and
wherein the transceiving of the first-mode wireless signal through the second antenna and the transceiving of the second-mode wireless signal through the second antenna are performed in the TDM mode.

5. The method according to claim 1, wherein the determining whether the impact of the mutual interference between the first antenna and the second antenna on the wireless signal transceiving of the first antenna and the second antenna exceeds the preset interference upper limit comprises:
in response to a determination that a transmit power of the first antenna to transmit the first-mode wireless signal affects performance of the second antenna in receiving the second-mode wireless signal or in response to a determination that a transmit power of the second antenna to transmit the second-mode wireless signal affects performance of the first antenna in receiving the first-mode wireless signal, determining that the impact of the mutual interference between the first antenna and the second antenna on the wireless signal transceiving of the first antenna and the second antenna exceeds the preset interference upper limit.

6. The method according to claim 1, wherein the determining whether the impact of the mutual interference between the first antenna and the second antenna on the wireless signal transceiving of the first antenna and the second antenna exceeds the preset interference upper limit comprises:
in response to a determination that a transmit power of the first antenna to transmit the first-mode wireless signal does not meet a requirement for performance of a first device in receiving the first-mode wireless signal or in response to a determination that a transmit power of the second antenna to transmit the second-mode wireless signal does not meet a requirement for performance of a second device in receiving the second-mode wireless signal, determining that the impact of the mutual interference between the first antenna and the second antenna on the wireless signal transceiving of the first antenna and the second antenna exceeds the preset interference upper limit,
wherein the first device is a device that transceives the first-mode wireless signal with the first antenna and the second device is a device that transceives the second-mode wireless signal with the second antenna.

7. A device for communication comprising:
at least one processor; and a memory configured to store instructions executable by the at least one processor, wherein the instructions cause the at least one processor to:
determine whether mutual interference between a first antenna and a second antenna exceeds a preset interference upper limit; and
in response to a determination that the mutual interference exceeds the preset interference upper limit, transceive a first-mode wireless signal through the first antenna and transceive a second-mode wireless signal through the second antenna,
wherein the transceived first-mode wireless signal through the first antenna and the transceived second-mode wireless signal through the second antenna are performed in a time-division multiplexing (TDM) mode, and
wherein the determination whether the mutual interference between the first antenna and the second antenna exceeds the preset interference upper limit comprises following operations:
obtaining a first signal strength of the first-mode wireless signal received by the first antenna;
obtaining a second signal strength of the second-mode wireless signal received by the second antenna;
in response to a determination that the first signal strength is less than a first strength threshold or in response to a determination that the second signal strength is less than a second strength threshold, determining that the mutual interference exceeds the preset interference upper limit;
in response to a determination that the first signal strength is less than a third strength threshold and the second signal strength is less than a fourth strength threshold, determining that the mutual interference exceeds the preset interference upper limit, wherein the third strength threshold is greater than the first strength threshold and the fourth strength threshold is greater than the second strength threshold; and in response to a determination that the first signal strength is less than a fifth strength threshold and the second signal strength is less than a sixth strength threshold, determining that the mutual interference exceeds the preset interference upper limit, wherein the fifth strength threshold is greater than the third strength threshold and the sixth strength threshold is greater than the fourth strength threshold.

8. The device according to claim 7, wherein the at least one processor is further caused to, in response to a determination that the mutual interference does not exceed the preset interference upper limit, transceive the first-mode wireless signal through the first antenna and transceive the second-mode wireless signal through the second antenna, wherein the transceived first-mode wireless signal through the first antenna and the transceived second-mode wireless signal through the second antenna are performed in a frequency-division multiplexing (FDM) mode.

9. The device according to claim 7, wherein the at least one processor is further caused to, in response to a determination that the mutual interference does not exceed the preset interference upper limit, transceive the first-mode wireless signal through the first antenna, and transceive the first-mode wireless signal and the second-mode wireless signal through the second antenna, wherein the transceived first-mode wireless signal through the first antenna and the transceived second-mode wireless signal through the second antenna are performed in a frequency-division multiplexing (FDM) mode, and wherein the transceived first-mode wireless signal through the second antenna and the transceived second-mode wireless signal through the second antenna are performed in the TDM mode.

10. The device according to claim 7, wherein the at least one processor is further caused to, in response to the determination that the mutual interference exceeds the preset interference upper limit, transceive the first-mode wireless signal through the first antenna, and transceive the first-mode wireless signal and the second-mode wireless signal through the second antenna, wherein the transceived first-mode wireless signal through the first antenna and the transceived second-mode wireless signal through the second antenna are performed in the TDM mode, and wherein the transceived first-mode wireless signal through the second antenna and the transceived second-mode wireless signal through the second antenna are performed in the TDM mode.

11. The device according to claim 7, wherein the determination whether the mutual interference between the first antenna and the second antenna exceeds the preset interference upper limit comprises:

in response to a determination that a transmit power of the first antenna to transmit the first-mode wireless signal affects performance of the second antenna in receiving the second-mode wireless signal or in response to a determination that a transmit power of the second antenna to transmit the second-mode wireless signal affects performance of the first antenna in receiving the first-mode wireless signal, determining that the mutual interference between the first antenna and the second antenna exceeds the preset interference upper limit.

12. The device according to claim 7, wherein the determination whether the mutual interference between the first antenna and the second antenna exceeds the preset interference upper limit comprises:

in response to a determination that a transmit power of the first antenna to transmit the first-mode wireless signal does not meet a requirement for performance of a first device in receiving the first-mode wireless signal or in response to a determination that a transmit power of the second antenna to transmit the second-mode wireless signal does not meet a requirement for performance of a second device in receiving the second-mode wireless signal, determining that the mutual interference between the first antenna and the second antenna exceeds the preset interference upper limit, wherein the first device is a device that transceives the first-mode wireless signal with the first antenna and the second device is a device that transceives the second-mode wireless signal with the second antenna.

13. A non-transitory computer-readable storage medium, wherein the computer-readable storage medium stores computer program instructions thereon, the computer program instructions, when executed by a processor, cause the processor to:

determine whether mutual interference between a first antenna and a second antenna exceeds a preset interference upper limit; and in response to a determination that the mutual interference between the first antenna and the second antenna exceeds the preset interference upper limit, transceive the first-mode wireless signal through the first antenna and transceive the second-mode wireless signal through the second antenna, wherein the transceived first-mode wireless signal through the first antenna and the transceived second-mode wireless signal through the second antenna are performed in a time-division multiplexing (TDM) mode, and wherein the determination whether the mutual interference between the first antenna and the second antenna exceeds the preset interference upper limit comprises following operations:

obtaining a first signal strength of the first-mode wireless signal received by the first antenna;

obtaining a second signal strength of the second-mode wireless signal received by the second antenna;

in response to a determination that the first signal strength is less than a first strength threshold or in response to a determination that the second signal strength is less than a second strength threshold, determining that the mutual interference exceeds the preset interference upper limit;

in response to a determination that the first signal strength is less than a third strength threshold and the second signal strength is less than a fourth strength threshold, determining that the mutual interference exceeds the preset interference upper limit, wherein the third strength threshold is greater than the first strength threshold and the fourth strength threshold is greater than the second strength threshold; and in response to a determination that the first signal strength is less than a fifth strength threshold and the second signal strength is less than a sixth strength threshold, determining that the mutual interference exceeds the preset interference upper limit, wherein the fifth strength threshold is greater than the third strength threshold and the sixth strength threshold is greater than the fourth strength threshold.

14. The storage medium according to claim 13, wherein the processor is further configured to:
in response to a determination that the mutual interference does not exceed the preset interference upper limit, transceive the first-mode wireless signal through the first antenna and transceive the second-mode wireless signal through the second antenna,
wherein the transceived first-mode wireless signal through the first antenna and the transceived second-mode wireless signal through the second antenna are performed in a frequency-division multiplexing (FDM) mode.

15. The storage medium according to claim 13, wherein the processor is further configured to:
in response to a determination that the mutual interference does not exceed the preset interference upper limit, transceive the first-mode wireless signal through the first antenna, and transceive the first-mode wireless signal and the second-mode wireless signal through the second antenna,
wherein the transceived first-mode wireless signal through the first antenna and the transceived second-mode wireless signal through the second antenna are performed in a frequency-division multiplexing (FDM) mode, and
wherein the transceived first-mode wireless signal through the second antenna and the transceived second-mode wireless signal through the second antenna are performed in the mode.

16. The storage medium according to claim 13, wherein the processor is further configured to:
in response to the determination that the mutual interference exceeds the preset interference upper limit, transceive the first-mode wireless signal through the first antenna, and transceive the first-mode wireless signal and the second-mode wireless signal through the second antenna,
wherein the transceived first-mode wireless signal through the first antenna and the transceived second-mode wireless signal through the second antenna are performed in the mode, and
wherein the transceived first-mode wireless signal through the second antenna and the transceived second-mode wireless signal through the second antenna are performed in the mode.

17. The storage medium according to claim 13, wherein the determination whether the mutual interference between the first antenna and the second antenna exceeds the preset interference upper limit comprises:
in response to a determination that a transmit power of the first antenna to transmit the first-mode wireless signal affects performance of the second antenna in receiving the second-mode wireless signal or in response to a determination that a transmit power of the second antenna to transmit the second-mode wireless signal affects performance of the first antenna in receiving the first-mode wireless signal, determining that the mutual interference between the first antenna and the second antenna exceeds the preset interference upper limit.

18. The storage medium according to claim 13, wherein the determination whether the mutual interference between the first antenna and the second antenna exceeds the preset interference upper limit comprises:
in response to a determination that a transmit power of the first antenna to transmit the first-mode wireless signal does not meet a requirement for performance of a first device in receiving the first-mode wireless signal or in response to a determination that a transmit power of the second antenna to transmit the second-mode wireless signal does not meet a requirement for performance of a second device in receiving the second-mode wireless signal, determining that the mutual interference between the first antenna and the second antenna exceeds the preset interference upper limit,
wherein the first device is a device that transceives the first-mode wireless signal with the first antenna, and the second device is a device that transceives the second-mode wireless signal with the second antenna.

* * * * *